United States Patent
Patel et al.

(10) Patent No.: US 10,959,216 B2
(45) Date of Patent: Mar. 23, 2021

(54) MULTIPLE TRANSMISSION TIME INTERVAL COORDINATION WITH TIME DIVISION DUPLEXING

(71) Applicant: QUALCOMM Incorporated, San Diego, CA (US)

(72) Inventors: Shimman Arvind Patel, San Diego, CA (US); Wanshi Chen, San Diego, CA (US); Juan Montojo, San Diego, CA (US); Jing Sun, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/358,042

(22) Filed: Mar. 19, 2019

(65) Prior Publication Data

US 2019/0215827 A1     Jul. 11, 2019

Related U.S. Application Data

(62) Division of application No. 15/592,850, filed on May 11, 2017, now Pat. No. 10,548,118.

(Continued)

(51) Int. Cl.
*H04W 72/04*     (2009.01)
*H04L 5/00*     (2006.01)
(Continued)

(52) U.S. Cl.
CPC ....... *H04W 72/0413* (2013.01); *H04L 1/1861* (2013.01); *H04L 5/0044* (2013.01);
(Continued)

(58) Field of Classification Search
CPC ......... H04W 72/0413; H04W 72/0446; H04W 24/02–04; H04L 1/1861; H04L 5/0044; H04L 5/0055; H04L 5/14; H04L 5/1469
See application file for complete search history.

(56) References Cited

U.S. PATENT DOCUMENTS

| | | | |
|---|---|---|---|
| 9,474,089 B2 | 10/2016 | Wei et al. | |
| 2013/0039233 A1* | 2/2013 | Dai | H04W 24/10 370/280 |

(Continued)

FOREIGN PATENT DOCUMENTS

| | | |
|---|---|---|
| CN | 101997663 A | 3/2011 |
| CN | 102687451 A | 9/2012 |

(Continued)

OTHER PUBLICATIONS

Huawei: "Discussion on Enhanced Frame Structure for Latency Reduction in TDD", 3GPP TSG RAN WG1 Meeting #84bis, R1-162116, 3rd Generation Partnership Project (3GPP), Mobile Competence Centre, 650, Route Des Lucioles; F-06921 Sophia-Antipolis Cedex; France, vol. RAN WG1, No. Busan, Korea; 20160411-201604152, Apr. 2016 (Apr. 2, 2016), XP051079963, Retrieved from the Internet: URL:http://www.3gpp.org/ftp/tsg_ran/WG1_RL1/TSGR1_84b/Doc/ [retrieved on Apr. 2, 2016].

(Continued)

*Primary Examiner* — Eric Myers
(74) *Attorney, Agent, or Firm* — Holland & Hart LLP

(57) ABSTRACT

Methods, systems, and devices for wireless communication are described. Data may be received during transmission time intervals (TTIs) that have a short duration relative to other TTIs. The short-duration TTIs may occur within or overlap a longer duration TTI, such as a subframe. Feedback responsive to the data may be generated and assigned for transmission during an uplink TTI according to a feedback timing or delay, which may be selected to reduce latency or (Continued)

balance the payload size of uplink messages sent during the assigned uplink TTI. Data and feedback assignments in short-duration TTIs may be configured based on a time division duplexing (TDD) configuration for some TTIs (e.g., subframes). TTIs that are a Long Term Evolution (LTE) subframe, an LTE slot, and a duration of two LTE symbol periods may be supported. Portions of special TTIs may be used for transmissions according to shorter-duration TTIs.

12 Claims, 21 Drawing Sheets

Related U.S. Application Data

(60) Provisional application No. 62/336,511, filed on May 13, 2016.

(51) Int. Cl.
  *H04L 5/14* (2006.01)
  *H04L 1/18* (2006.01)

(52) U.S. Cl.
  CPC .............. *H04L 5/0055* (2013.01); *H04L 5/14* (2013.01); *H04L 5/1469* (2013.01); *H04W 72/0446* (2013.01)

(56) References Cited

U.S. PATENT DOCUMENTS

| | | |
|---|---|---|
| 2015/0092645 A1 | 4/2015 | Tabet et al. |
| 2016/0119948 A1 | 4/2016 | Damnjanovic et al. |
| 2016/0345311 A1 | 11/2016 | Chen et al. |
| 2017/0223702 A1 | 8/2017 | Yin et al. |
| 2017/0288819 A1 | 10/2017 | Chen et al. |
| 2017/0332373 A1 | 11/2017 | Patel et al. |

FOREIGN PATENT DOCUMENTS

| | | | | |
|---|---|---|---|---|
| WO | WO-2013055337 A1 * | 4/2013 | ........ | H04W 72/1278 |
| WO | WO-2017014558 A1 | 1/2017 | | |

OTHER PUBLICATIONS

Huawei: "Overview of short TTI", 3GPP DRAFT, R1-156458, 3GPP TSG RAN WG1 Meeting #83, 3rd Generation Partnership Project (3GPP), Mobile Competence Centre, 650, Route Des Lucioles; F-06921 Sophia-Antipolis, Cedex; France, vol. RAN WG1, No. Anaheim, USA, Nov. 15, 2015, Nov. 15, 2015 (Nov. 15, 2015), XP051002918, Retrieved from the Internet: URL:http://www.3gpp.org/ftp/Meetings 3GPP_SYNC/RAN1/Doc/[retrieved on Nov. 15, 2015].

International Search Report and Written Opinion—PCT/US2017/032487—ISA/EPO—dated Sep. 29, 2017 (163350WO).

ISA/EPO, Partial International Search Report of the International Searching Authority, Int'l. App. No. PCT/US2017/032487, dated Aug. 8, 2017, European Patent Office, Rijswijk, NL, 13 pgs (163350W0).

NTT Docomo et al., "Discussion about TDD Frame Structure for Latency Reduction", 3GPP TSG RAN WG1 Meeting #84bis, R1-163174, Apr. 1, 2016, XP051079879, Retrieved from the Internet: URL:http://www.3gpp.org/ftp/tsg ran/WG1_RL1/TSGR1_84b/Docs/, 5 pages.

Huawei et al., "Discussion on New Frame Structure for Latency Reduction in TDD", 3GPP TSG RAN WG1 Meeting #84, R1-160754, St. Julian's, Malta, Feb. 15-19, 2016, Feb. 6, 2016, 9 Pages.

* cited by examiner

MULTIPLE TRANSMISSION TIME INTERVAL COORDINATION WITH TIME DIVISION DUPLEXING

CROSS REFERENCES

The present application for patent is a Divisional of U.S. patent application Ser. No. 15/592,850 by Patel et al., entitled "Multiple Transmission Time Interval Coordination With Time Division Duplexing," filed May 11, 2017, which claims priority to U.S. Provisional Patent Application No. 62/336,511 by Patel et al., entitled "Multiple Transmission Time Interval Coordination With Time Division Duplexing," filed May 13, 2016, each of which are assigned to the assignee hereof and expressly incorporated by reference herein in their entirety.

BACKGROUND

The following relates generally to wireless communication and more specifically to multiple transmission time interval (TTI) coordination within a time division duplexing (TDD) configuration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

Within multiple access systems, methods for error control (e.g., hybrid automatic repeat request (HARQ)) may provide feedback regarding the success of a transmission. In some cases, data received using TTIs of a short duration relative to other TTIs, feedback may correspondingly be provided in a short duration TTI. However, a timing between data reception and feedback transmission may result in unnecessary communication delays and reduced system performance if the timing does not account for the durations of the TTIs associated with the data and feedback.

SUMMARY

The described techniques provide for efficient feedback timing, such as hybrid automatic repeat request (HARQ) timing, in a system supporting multiple transmission time intervals (TTI) in a time division duplexing (TDD) configuration. A device, such as a user equipment (UE), operating according to the TDD configuration may receive data during TTIs that have a short duration relative to other TTIs. The short-duration TTIs may occur within or overlap a longer duration TTI, such as a subframe. The device may generate feedback responsive to the data and may assign the feedback for transmission during an uplink TTI according to a feedback timing or delay. The feedback timing may be selected or imposed by the system to reduce latency or balance the payload size of uplink messages sent during the assigned uplink TTI.

By way of example, a wireless device may receive data during one or more short TTIs during a downlink subframe. HARQ feedback may be generated based on the data and may be assigned to an uplink TTI according to a predetermined feedback timing. In some cases, feedback timing may include an additional delay factor to balance the payload size for uplink messages sent during the uplink TTIs. Additionally or alternatively, transmissions may be coordinated or adjusted to account for a TDD configuration. For example, a short-duration TTI may be within a guard period or an uplink pilot signal (UpPTS) of a special subframe and may be used for transmitting the feedback. In some case, a UE's capabilities or timing advance condition, or both, along with a feedback timing, may be evaluated or used to identify TTIs of a TDD configuration for communications with the UE.

A method of wireless communication in a system that supports a TDD configuration with TTIs of a first duration and TTIs of a second duration that is less than the first duration is described. The method may include receiving first data during a first TTI of the second duration and second data during a second TTI of the second duration. The method may also include generating first feedback for the first data and second feedback for the second data, assigning the first feedback and the second feedback to an uplink TTI of the first duration in the TDD configuration based at least in part on a feedback timing associated with TTIs of the second duration, and transmitting the first feedback and the second feedback during the uplink TTI of the first duration.

An apparatus for wireless communication in a system that supports a TDD configuration with TTIs of a first duration and TTIs of a second duration that is less than the first duration is described. The apparatus may include means for receiving first data during a first TTI of the second duration and second data during a second TTI of the second duration. The apparatus may also include means for generating first feedback for the first data and second feedback for the second data, means for assigning the first feedback and the second feedback to an uplink TTI of the first duration in the TDD configuration based at least in part on a feedback timing associated with TTIs of the second duration, and means for transmitting the first feedback and the second feedback during the uplink TTI of the first duration.

Another apparatus for wireless communication in a system that supports a TDD configuration with TTIs of a first duration and TTIs of a second duration that is less than the first duration is described. The apparatus may include a processor, memory in electronic communication with the processor, and instructions stored in the memory. The instructions may be operable when executed by the processor to cause the apparatus to receive first data during a first TTI of the second duration and second data during a second TTI of the second duration, generate first feedback for the first data and second feedback for the second data, assign the first feedback and the second feedback to an uplink TTI of the first duration in the TDD configuration based at least in part on a feedback timing associated with TTIs of the second duration, and transmit the first feedback and the second feedback during the uplink TTI of the first duration.

A non-transitory computer readable medium storing code for wireless communication in a system that supports a TDD configuration with TTIs of a first duration and TTIs of a second duration that is less than the first duration is described. The code may include instructions executable to receive first data during a first TTI of the second duration and second data during a second TTI of the second duration, generate first feedback for the first data and second feedback for the second data, assign the first feedback and the second feedback to an uplink TTI of the first duration in the TDD configuration based at least in part on a feedback timing associated with TTIs of the second duration, and transmit the first feedback and the second feedback during the uplink TTI of the first duration.

Another method of wireless communication in a system that supports a TDD configuration with TTIs of a first duration and TTIs of a second duration that is less than the first duration is described. The method may include identifying an uplink pilot time slot (UpPTS) of a special TTI of the first duration in the TDD configuration, identifying a TTI of the second duration during the UpPTS, and transmitting an uplink message during the TTI of the second duration.

Another apparatus for wireless communication in a system that supports a TDD configuration with TTIs of a first duration and TTIs of a second duration that is less than the first duration is described. The apparatus may include means for identifying an uplink pilot time slot (UpPTS) of a special TTI of the first duration in the TDD configuration, means for identifying a TTI of the second duration during the UpPTS, and means for transmitting an uplink message during the TTI of the second duration.

Another apparatus for wireless communication in a system that supports a TDD configuration with TTIs of a first duration and TTIs of a second duration that is less than the first duration is described. The apparatus may include a processor, memory in electronic communication with the processor, and instructions stored in the memory. The instructions may be operable, when executed by the processor, to cause the apparatus to identify an UpPTS of a special TTI of the first duration in the TDD configuration, identify a TTI of the second duration during the UpPTS, and transmit an uplink message during the TTI of the second duration.

Another non-transitory computer-readable medium storing code for wireless communication in a system that supports a TDD configuration with TTIs of a first duration and TTIs of a second duration that is less than the first duration is described. The code may include instructions operable to cause a processor to identify an UpPTS of a special TTI of the first duration in the TDD configuration, identify a TTI of the second duration during the UpPTS, and transmit an uplink message during the TTI of the second duration.

Another method of wireless communication in a system that supports a TDD configuration with TTIs of a first duration and TTIs of a second duration that is less than the first duration is described. The method may include transmitting first data during a first TTI of the second duration and second data during a second TTI of the second duration, identifying an uplink TTI of the first duration in the TDD configuration based at least in part on a feedback timing associated with TTIs of the second duration, and receiving first feedback for the first data and second feedback for the second data during the uplink TTI of the first duration.

Another apparatus for wireless communication in a system that supports a TDD configuration with TTIs of a first duration and TTIs of a second duration that is less than the first duration is described. The apparatus may include means for transmitting first data during a first TTI of the second duration and second data during a second TTI of the second duration, means for identifying an uplink TTI of the first duration in the TDD configuration based at least in part on a feedback timing associated with TTIs of the second duration, and means for receiving first feedback for the first data and second feedback for the second data during the uplink TTI of the first duration.

Another apparatus for wireless communication in a system that supports a TDD configuration with TTIs of a first duration and TTIs of a second duration that is less than the first duration is described. The apparatus may include a processor, memory in electronic communication with the processor, and instructions stored in the memory. The instructions may be operable when executed by the processor to cause the apparatus to transmit first data during a first TTI of the second duration and second data during a second TTI of the second duration, identify an uplink TTI of the first duration in the TDD configuration based at least in part on a feedback timing associated with TTIs of the second duration, and receive first feedback for the first data and second feedback for the second data during the uplink TTI of the first duration.

Another non-transitory computer-readable medium storing code for wireless communication in a system that supports a TDD configuration with TTIs of a first duration and TTIs of a second duration that is less than the first duration is described. The code may include instructions operable to cause a processor to transmit first data during a first TTI of the second duration and second data during a second TTI of the second duration, identify an uplink TTI of the first duration in the TDD configuration based at least in part on a feedback timing associated with TTIs of the second duration, and receive first feedback for the first data and second feedback for the second data during the uplink TTI of the first duration.

Another method of wireless communication in a system that supports a TDD configuration with TTIs of a first duration and TTIs of a second duration that is less than the first duration is described. The method may include restricting one or more TTIs of the first duration in the TDD configuration for communication with a subset of user equipment (UEs) in the system based at least in part on a delay metric, scheduling the subset of UEs according to the restriction of the one or more TTIs of the first duration, and communicating with the subset of UEs in one or more TTIs of the second duration based at least in part on the scheduling.

Another apparatus for wireless communication in a system that supports a TDD configuration with TTIs of a first duration and TTIs of a second duration that is less than the first duration is described. The apparatus may include means for restricting one or more TTIs of the first duration in the TDD configuration for communication with a subset of user equipment (UEs) in the system based at least in part on a delay metric, means for scheduling the subset of UEs according to the restriction of the one or more TTIs of the first duration, and means for communicating with the subset of UEs in one or more TTIs of the second duration based at least in part on the scheduling.

Another apparatus for wireless communication in a system that supports a TDD configuration with TTIs of a first duration and TTIs of a second duration that is less than the first duration is described. The apparatus may include a processor, memory in electronic communication with the processor, and instructions stored in the memory. The instructions may be operable when executed by the processor to cause the apparatus to restrict one or more TTIs of the first duration in the TDD configuration for communication with a subset of user equipment (UEs) in the system based at least in part on a delay metric, schedule the subset of UEs according to the restriction of the one or more TTIs of the first duration, and communicate with the subset of UEs in one or more TTIs of the second duration based at least in part on the scheduling.

Another non-transitory computer-readable medium storing code for wireless communication in a system that supports a TDD configuration with TTIs of a first duration and TTIs of a second duration that is less than the first duration is described. The code may include instructions operable to cause a processor to restrict one or more TTIs of the first duration in the TDD configuration for communication with a subset of user equipment (UEs) in the system based at least in part on a delay metric, schedule the subset of UEs according to the restriction of the one or more TTIs of the first duration, and communicate with the subset of UEs in one or more TTIs of the second duration based at least in part on the scheduling.

Another method of wireless communication in a system that supports a TDD configuration with TTIs of a first duration and TTIs of a second duration that is less than the first duration is described. The method may include identifying an UpPTS of a special TTI of the first duration in the TDD configuration, identifying a TTI of the second duration during the UpPTS, and receiving an uplink control or data message during the TTI of the second duration from a first UE.

Another apparatus for wireless communication in a system that supports a TDD configuration with TTIs of a first duration and TTIs of a second duration that is less than the first duration is described. The apparatus may include means for identifying an UpPTS of a special TTI of the first duration in the TDD configuration, means for identifying a TTI of the second duration during the UpPTS, and means for receiving an uplink control or data message during the TTI of the second duration from a first UE.

Another apparatus for wireless communication in a system that supports a TDD configuration with TTIs of a first duration and TTIs of a second duration that is less than the first duration is described. The apparatus may include a processor, memory in electronic communication with the processor, and instructions stored in the memory. The instructions may be operable, when executed by the processor, to cause the apparatus to identify an UpPTS of a special TTI of the first duration in the TDD configuration, identify a TTI of the second duration during the UpPTS, and receive an uplink control or data message during the TTI of the second duration from a first UE.

Another non-transitory computer-readable medium storing code for wireless communication in a system that supports a TDD configuration with TTIs of a first duration and TTIs of a second duration that is less than the first duration is described. The code may include instructions operable to cause a processor to identify an UpPTS of a special TTI of the first duration in the TDD configuration, identify a TTI of the second duration during the UpPTS, and receive an uplink control or data message during the TTI of the second duration from a first UE.

DETAILED DESCRIPTION

Shortened transmission time intervals (TTIs) may allow for reduced turnaround time and a shorter hybrid automatic repeat request (HARQ) feedback delay. In some cases, TTIs that have a reduced duration relative to other TTIs of a system may facilitate latency reduction for some operations. Predetermined delays associated with HARQ feedback may be applied based on shortened or reduced-duration TTIs (e.g., slot TTIs or two-symbol TTIs rather than 1 ms TTIs) in low latency systems. The feedback delay may also be based on balancing considerations. For example, a timing between downlink data and responsive feedback may be selected to achieve an even load of HARQ feedback over multiple uplink (UL) TTIs. In some cases, a feedback timing or delay may be increased beyond a predetermined time period to even the feedback load across the TTIs of the next UL period (e.g., one or more UL TTIs within one or more UL subframes). HARQ feedback or uplink control channel load balancing may accordingly allow for improved UL channel design by limiting variable or large format maximum in uplink payload sizes.

In some cases, feedback timing, or a delay between data reception and corresponding uplink feedback, may be directly or indirectly based on a user equipment (UE) capability, modulation and coding scheme (MCS), or a timing advance (TA). For example, downlink (DL) TTIs may be scheduled to account for a UE TA, UE processing capabilities, or a MCS (e.g., a high MCS may be associated with additional processing time). That is, UEs that have a higher TA, or that benefit from additional processing time, may be scheduled before UEs that may respond with feedback after a shorter time period. Further, a special subframe may be utilized to support short TTI HARQ feedback. For example, a short TTI during a guard period and/or an uplink pilot signal (UpPTS) may be used for transmitting the HARQ feedback.

Aspects of the disclosure introduced above are described below in the context of a wireless communication system. Specific examples of HARQ feedback timing configurations are then described. Aspects of the disclosure are further illustrated by and described with reference to apparatus diagrams, system diagrams, and flowcharts that relate to title of the application.

Figure 1:
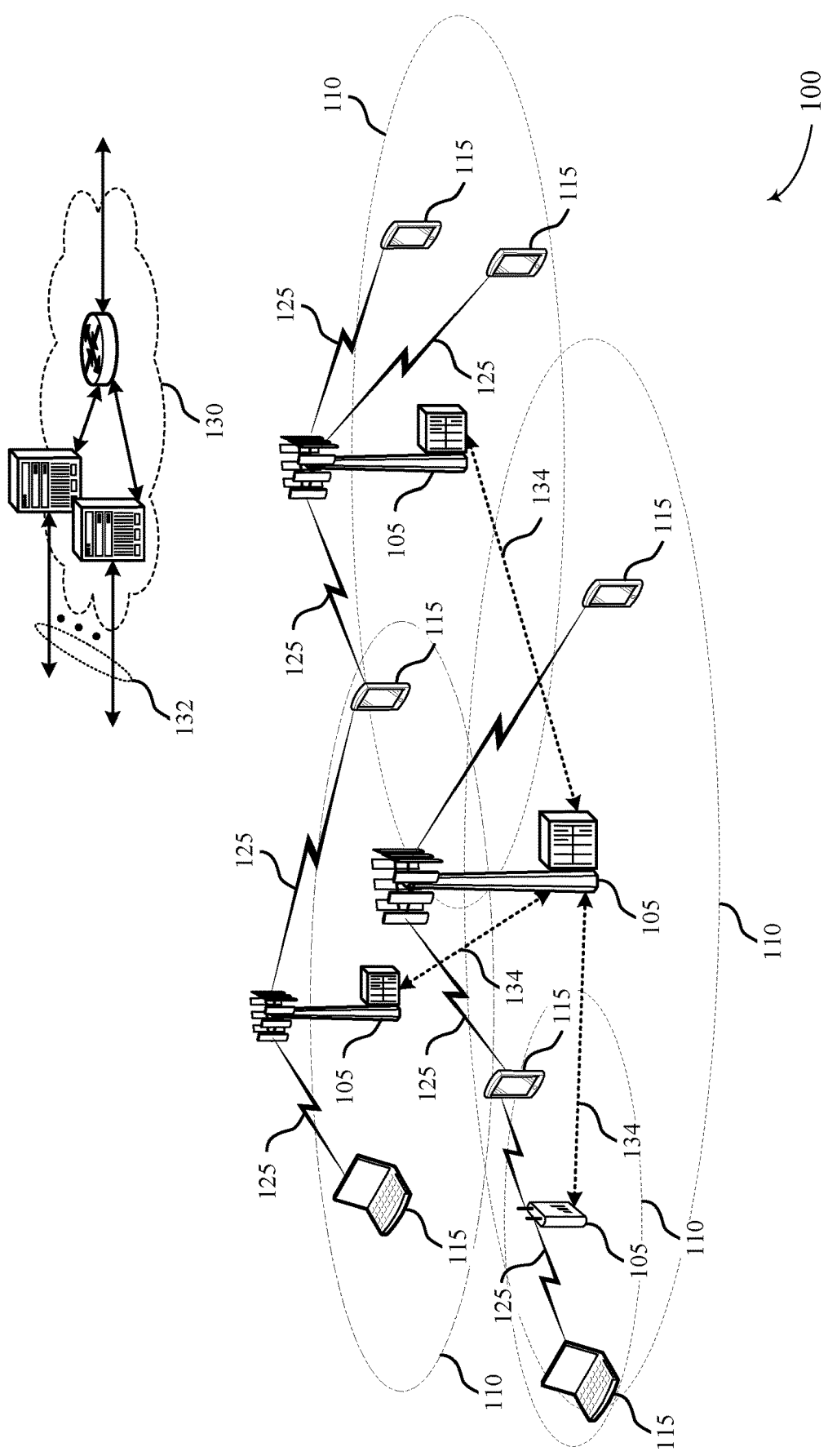
FIGS. 1 and 2 illustrates an example of a wireless communications system that supports multiple transmission time interval (TTI) coordination within a time division duplexing (TDD) configuration in accordance with aspects of the present disclosure.

FIG. 1 illustrates an example of a wireless communications system 100 that supports multiple TTI coordination within a time division duplexing (TDD) configuration in accordance with aspects of the present disclosure. The wireless communications system 100 includes base stations 105, UEs 115, and a core network 130. In some examples, the wireless communications system 100 may be a Long Term Evolution (LTE) or LTE-Advanced network. Wireless communications system 100 may support a shortened a TDD configuration based on a reduced TTI duration.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine-type communication (MTC) device, etc.

Base stations 105 may communicate with the core network 130 and with one another. For example, base stations 105 may interface with the core network 130 through backhaul links 132 (e.g., 51, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Carriers may transmit bidirectional communications using frequency division duplexing (FDD) (e.g., using paired spectrum resources) or TDD (e.g., using unpaired spectrum resources). Frame structures or configurations for FDD (e.g., frame structure type 1) and TDD (e.g., frame structure type 2) may be defined. Use of TDD may offer flexible deployments without paired UL-DL spectrum resources. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL traffic (e.g., via downlink pilot time slot (DwPTS)) or UL traffic (e.g., via uplink pilot time slot (UpPTS)) and may include a Guard Period (GP) between DL and UL traffic. Switching from UL to DL traffic may be achieved by setting a TA at the UE 115 without the use of special subframes or a guard period.

Time intervals in LTE may be expressed in multiples of a basic time unit (e.g., the sampling period, $T_s = 1/30,720,000$ seconds). Time resources may be organized according to radio frames of length of 10 ms ($T_f = 307200$ Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods.

A frame structure may be used to organize physical resources. A frame may be a 10 ms interval that may be further divided into 10 equally sized sub-frames. Each sub-frame may include two consecutive time slots. Each slot may include six or seven orthogonal frequency division multiple access (OFDMA) symbol periods. A resource element consists of one symbol period and one subcarrier (a 15 KHz frequency range). A resource block may contain 12 consecutive subcarriers in the frequency domain and, for a normal cyclic prefix in each orthogonal frequency-division multiplexing (OFDM) symbol, 7 consecutive OFDM symbols in the time domain (1 slot), or 84 resource elements. Some resource elements may include DL reference signals (DL-RS). The DL-RS may include a cell-specific reference signal (CRS) and a UE-specific RS (UE-RS). UE-RS may be transmitted on the resource blocks associated on a physical downlink shared channel (PDSCH). The number of bits carried by each resource element may depend on the modulation scheme (the configuration of symbols that may be selected during each symbol period). Thus, the more resource blocks that a UE receives and the higher the modulation scheme, the higher the data rate may be.

A TTI may be defined as the smallest unit of time in which a base station 105 may schedule a UE 115 for UL or DL transmission. For example, if a UE 115 is receiving DL data, then during each TTI a base station 105 may assign resources and indicate (via downlink control transmissions) to the UE 115 where to look for its DL data. In some cases, a subframe may be the basic unit of scheduling or TTI. In other cases, such as with low latency operation, a different, reduced-duration TTI (e.g., a short TTI) may be used. A reduced-duration or short TTI may have a duration of a symbol period, a pair of symbol periods, a slot (i.e., half of a subframe), or other durations less than 1 ms. TTIs for low latency operation may thus have a numerology that is compatible with other LTE transmission structures and timing (e.g., subframe). The wireless communications system 100 may concurrently support communication using TTIs over different duration (e.g., TTIs having a duration of a subframe and TTIs having a duration of a symbol period or a slot).

Wireless communications system 100 may support communications according to a protocol organized into different layers. At the physical layer, a physical downlink control channel (PDCCH) may carry downlink control information (DCI) in control channel elements (CCEs), which may consist of nine logically contiguous resource element groups (REGs), where each REG contains 4 resource elements (REs). DCI includes information regarding DL scheduling assignments, UL resource grants, transmission scheme, UL power control, HARQ information, MCS and other information. A physical uplink control channel (PUCCH) may be used for UL acknowledgements (ACKs), scheduling requests (SRs) and channel quality indicators (CQI) and other UL control information. A PUCCH may be mapped to a control channel defined by a code and two consecutive resource blocks. UL control signaling may depend on the presence of timing synchronization for a cell. PUCCH resources for scheduling request (SR) and CQI reporting may be assigned (and revoked) through radio resource control (RRC) signaling.

Within wireless communications system 100 or similar systems, HARQ may be a method of ensuring that data is received correctly over a communication link 125. HARQ may include a combination of error detection (e.g., using a cyclic redundancy check (CRC)), forward error correction (FEC), and retransmission (e.g., automatic repeat request (ARQ)). The chain of transmission, response and retransmission may be referred to as a HARQ process. HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data.

The response in a HARQ process may include an ACK indicating a successful attempt to decode information and a negative-acknowledgement (NACK) indicating a failed attempt to decode the information. In some cases, redundancy bits are added to each message prior to transmission. This may be useful in poor conditions. In other cases, redundancy bits are not added to each transmission, but are retransmitted after the transmitter of the original message receives a NACK indicating a failed attempt to decode the information. The chain of transmission, response and retransmission may be referred to as a HARQ process. In some cases, a limited number of HARQ processes may be used for a given communication link 125. A time delay may determine or dictate when HARQ feedback is transmitted on the UL. That is, the TTI scheduled for HARQ feedback transmission may be associated with a predetermined delay (e.g., feedback timing) from the DL reception TTI.

To maintain synchronization with the base station 105, the UE 115 may transmit based on a TA value. The TA value may account for signal propagation delay due to the geographic distance between a UE 115 and the base station 105. The base station 105 or the UE 115 may determine the signal propagation delay. In an example, TA may change over time as the physical distance between a UE 115 and the base station 105 changes. When the UE 115 and base station 105 are geographically closer, the signal propagation delay may be shorter and, when geographically farther apart, the signal propagation delay may be longer. The UE 115 may use the TA value to determine when to send a signal such that the base station 105 receives the signal at the correct time along a timeline in accordance with the reception of other signals from other UEs 115.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

An eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

HARQ timing in wireless communications system 100 may vary with or depend on a TTI duration used for communication. UEs 115 operating in a TDD configuration may receive data during short-duration TTIs (e.g., two-symbol or 1-slot). The short-duration TTIs may occur within or overlap a longer-duration TTI, such as a subframe. UEs 115 may generate feedback responsive to the data and may assign the feedback for transmission during an uplink TTI according to a feedback timing or delay. The feedback timing may be selected or imposed by wireless communications system 100 to reduce latency or balance the payload size of uplink messages sent during the assigned uplink TTI.

Figure 2:
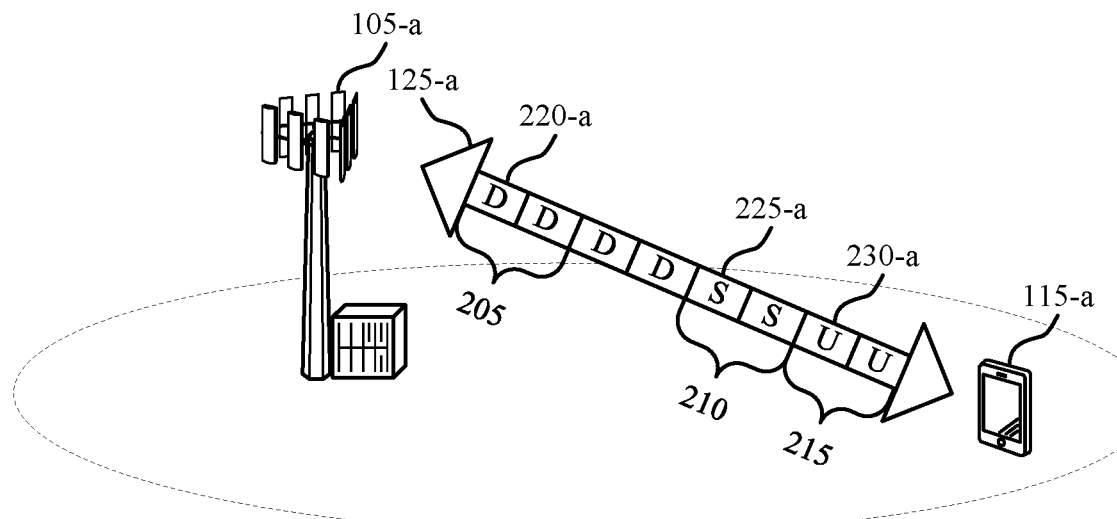

FIG. 2 illustrates an example of a wireless communications system 200 that supports multiple TTI coordination within a TDD configuration in accordance with aspects of the present disclosure. In some cases, wireless communications system 200 may represent aspects of techniques performed by a UE 115 or base station 105 as described with reference to FIG. 1.

Wireless communications system 200 may be an example of a shortened TTI system employing bidirectional communications using TDD. An example base station 105-a and UE 115-a may support shortened TTI HARQ feedback over communication link 125-a. DL subframes 205 may include DL TTIs 220, special subframes 210 may include special TTIs 225, and UL subframes 215 may include UL TTIs 230.

In some cases, a HARQ feedback timing may be based on a shortened TTI duration (e.g., a slot TTI or two-symbol TTI). A shortened TTI (e.g., DL TTIs 220, special TTIs 225, and UL TTIs 230) may allow for reduced turnaround time and a shorter HARQ feedback delay. HARQ feedback delays associated with other wireless communication systems (e.g., predetermined time period delays associated with subframe durations) may be applied to shortened TTIs in low latency systems. The predetermined time may be a number, k, TTIs after a DL TTI 220. For example, HARQ timing may follow an N+k rule where N is the DL TTI 220 and N+k is the soonest TTI available for HARQ feedback (e.g., if N+k is an UL TTI 230). That is, if N is DL TTI 220-a and k=4, HARQ feedback may be handled by UL TTI 230-a, as UL TTI 230-a is the next TTI available for UL and also satisfies the N+4 rule. In some cases, a two-symbol DL TTI and one-slot UL TTI system may support HARQ feedback using shortened TTIs. For example, UL slot TTIs may carry two-symbol TTI transmissions from a DL subframe 205 (e.g., UL slot TTIs carry seven (7) two-symbol TTIs from a previous DL subframe).

Using a short TTI HARQ feedback may result in shorter HARQ timing gaps or delays. According to predetermined delays, utilization of a slot TTI (e.g., 0.5 ms) or a two-symbol TTI (e.g., approximately 0.143 ms or 0.16 ms depending on a 14 symbol or 12 symbol subframe) may offer shorter HARQ gaps than a subframe TTI (e.g., 1 ms). For example, the last column of table 1 illustrates the reduced timing gaps associated with a slot TTI. The first two columns indicate a DL TTI and a corresponding UL TTI (e.g., after the arrow) that handles the HARQ feedback of the DL TTI. A first number indicates a subframe (e.g., a TTI in the first column) and a number following a dash indicates a short TTI (e.g., in the second column where a TTI is shorter than a subframe). A number in parenthesis indicates a HARQ timing gap associated with the feedback. For an LTE Type 1 TDD frame configuration, which may include downlink subframes at indices 0, 4, 5, and 9, uplink subframes at indices 2, 3, 7, and 8, and special subframes at indices 1 and 6, the HARQ timing information may be depicted in Table 1.

while cell edge users may be scheduled earlier in a DL subframe 205 due to a larger TA. Additionally or alternatively, high MCS may use more processing capability and may be scheduled earlier. For more stringent cases, the slot-TTI may have 3-slot for HARQ feedback processing. A small TA (e.g., less than 10 us) may ensure enough time for processing. However, if by design and/or TDD limitations a DL slot TTI transmission has a response time of more than 3-slot, the TA tolerance level may be correspondingly increased. For example, a 4-slot HARQ timing delay may tolerate at least 500 us TA and a 5-slot HARQ timing delay may tolerate 667 us TA (e.g., a max TA). Therefore, if a UE 115 has a large TA and/or has lower processing capability, ultra-low latency (ULL) may be supported for the UE 115 in restricted short TTI transmission instances such that the HARQ timing delay is at least 4-slot (e.g., or 5-slot). Similar considerations may be applied for two-symbol TTI scenarios.

A special subframe 210 may also be used to support short TTI HARQ feedback. For example, additional symbols or TTIs may be prepended to a UpPTS region (e.g., special TTI 225) of a special subframe 210 to convey uplink transmissions (e.g., HARQ feedback and channel state information (CSI)). For example, if N is DL TTI 220-$a$ and $k$ is 4, HARQ feedback may be handled by special TTI 225-$a$, as special TTI 225-$a$ is the next TTI available for UL and also satisfies the N+4 rule. ULL users may know additional symbols are added or scheduled in front of the UpPTS and may make use of them for short TTI HARQ feedback. In some cases, if a configured sounding reference signal (SRS) is configured for a portion of the UpPTS symbol length, the remaining portion may be used for transmitting HARQ feedback, CSI, and/or uplink data (on, e.g., a PUCCH or physical uplink shared channel (PUSCH)). In these cases, backwards compatibility may be maintained. That is, non-ULL users may still use the symbols for SRS while ULL users may multiplex onto the UpPTS region for the transmissions described above. Therefore, a portion of the UL portion of a special subframe 210 may be repurposed, or a prepended region for short TTI may

TABLE 1

Example HARQ timing savings for a Slot TTI

| Subframe TTI (1 ms) | Slot TTI (0.5 ms) | HARQ Timing Gap Savings |
|---|---|---|
| {0 → 7}(7 ms) | {0-1 → 2-1}(2 ms) & {0-2 → 2-2}(2 ms) | 5 ms |
| {1 → 7}(6 ms) | {1-1 → 3-1}(2 ms) | 4 ms |
| {4 → 8}(4 ms) | {4-1 → 7-1}(3 ms) & {4-2 → 7-1}(2.5 ms) | 1 ms and 1.5 ms |
| {5 → 2}(7 ms) | {5-1 → 7-1}(2 ms) & {5-2 → 7-2}(2 ms) | 5 ms |
| {6 → 2}(6 ms) | {6-1 → 8-1}(2 ms) | 4 ms |
| {9 → 3}(4 ms) | {9-1 → 2-1}(3 ms) & {9-2 → 2-1}(2.5 ms) | 1 ms and 1.5 ms |

Table 2 illustrates the comparison between subframe TTI and two-symbol TTI (e.g., in a 7 symbol per slot configuration) HARQ feedback, and follows the same conventions as Table 1:

TABLE 2

Example HARQ timing savings for a Two-Symbol TTI

| Subframe TTI (1 ms) | two-symbol DL TTI (~0.143 ms) Slot UL TTI (0.5 ms) | HARQ Timing Gap Savings |
|---|---|---|
| {0 → 7}(7 ms) | {0-1, 0-2, 0-3, 0-4, 0-5, 0-6, 0-7 → 2}(~1.5 ms) | ~5.5 ms |
| {1 → 7}(6 ms) | {1-1, 1-2, 1-3, 1-4, 1-5, 1-6, 1-7 → 2}(~0.75 ms) | ~5.25 ms |
| {4 → 8}(4 ms) | {4-1, 4-2, 4-3, 4-4, 4-5, 4-6, 4-7 → 7}(~2.5 ms) | ~1.5 ms |
| {5 → 2}(7 ms) | {5-1, 5-2, 5-3, 5-4, 5-5, 5-6, 5-7 → 7}(~1.5 ms) | ~5.5 ms |
| {6 → 2}(6 ms) | {6-1, 6-2, 6-3, 6-4, 6-5, 6-6, 6-7 → 7}(~0.75 ms) | ~5.25 ms |
| {9 → 3}(4 ms) | {9-1, 9-2, 9-3, 9-4, 9-5, 9-6, 9-7 → 2}(~2.5 ms) | ~1.5 ms |

A delay period may be further based on an attempt to balance an even load of HARQ feedback over multiple UL TTIs 230 (e.g., slots). That is, a HARQ feedback delay may be increased beyond a predetermined time period in order to balance the feedback load across the TTIs of the next UL period (e.g., one or more UL TTIs 230 within an UL subframe 215). HARQ feedback load balancing may allow for improved channel design. Specifically, less variability in HARQ feedback load may allow for more efficient channel design (e.g., of a PUCCH) resulting from less stringent constraints arising from the ability to support less variable channel payloads. HARQ timing according to shortened TTIs may result in increased benefit when used in a carrier aggregation (CA) scheme.

The delay period may further be based on a UE capability or TA. That is, short TTIs in different transmission instances in TDD may have different HARQ timing and may result in different tolerances of UL TAs. Near cell users with smaller TA may be scheduled in the latter part of a DL subframe 205 be added for shortened control or data (e.g., short TTI HARQ feedback).

Figure 3:
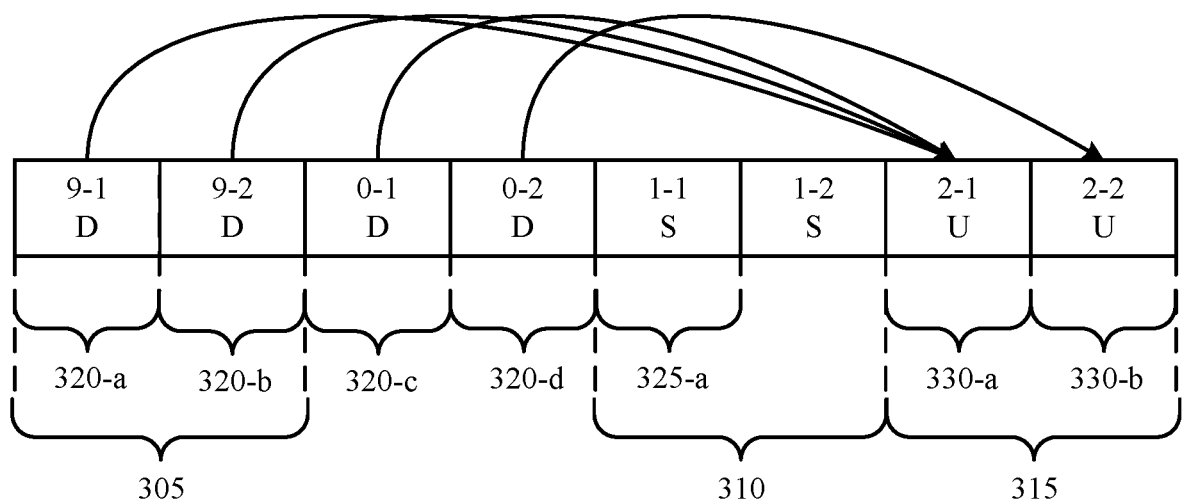
FIGS. 3 through 6 illustrate an example of a TDD configuration that supports multiple TTI coordination within a TDD configuration in accordance with aspects of the present disclosure.

FIG. 3 illustrates an example of a TDD configuration 300 that supports multiple TTI coordination within a TDD configuration in accordance with aspects of the present disclosure. In some cases, TDD configuration 300 may represent aspects of techniques performed by a UE 115 or base station 105 as described with reference to FIGS. 1 and 2.

TDD configuration 300 illustrates HARQ feedback using shortened TTIs according to a predetermined delay. In TDD configuration 300, DL subframes 305 may include DL TTIs 320, special subframes 310 may include special TTIs 325, and UL subframes 315 may include UL TTIs 330. Different TDD configurations may have a different ordering of DL, UL, and special subframes. In TDD configuration 300, a given TTI may be associated with a subframe number, the number of the TTI within the subframe, and the directionality of the subframe. For example, DL TTI 320-*b* is the second TTI within the ninth subframe (e.g., 9-2) in the downlink direction (e.g., D).

The example illustrated in TDD configuration 300 assumes a predetermined delay rule of N+k with k=4. For DL TTI 320-*d* (e.g., the second DL TTI of subframe 0) the TTI that satisfies the N+4 rule is UL TTI 330-*b* and thus handles the HARQ feedback associated with DL TTI 320-*d*. Additionally, as described above, the TTI that handles HARQ feedback may be a TTI suitable for UL transmissions. For example, for DL TTI 320-*a* (e.g., DL TTI 9-1) the TTI that satisfies the N+4 rule is special TTI 325-*a*. However, UL TTI 330-*a* may handle the HARQ feedback associated with DL TTI 320-*a* as it is the next TTI suitable for UL.

Similarly, the HARQ feedback for DL TTI 320-*b* and DL TTI 320-*c* may also be handled by UL TTI 330-*a*. According to the method described above, HARQ feedback may be handled by the earliest available TTI and may result in unbalanced handling of HARQ feedback (e.g., UL TTI 330-*a* handles HARQ feedback for 3 DL TTIs 320 and UL TTI 330-*b* handles HARQ feedback for 1 DL TTI 330).

Figure 4:
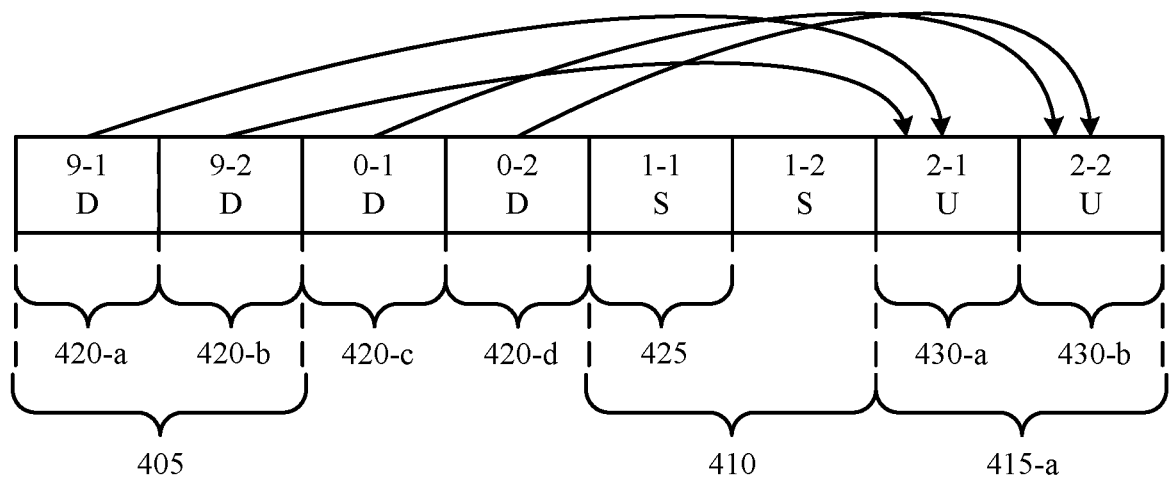

FIG. 4 illustrates an example of a TDD configuration 400 that supports multiple TTI coordination within a TDD configuration in accordance with aspects of the present disclosure. In some cases, TDD configuration 400 may represent aspects of techniques performed by a UE 115 or base station 105 as described with reference to FIGS. 1 and 2.

TDD configuration 400 illustrates balanced HARQ feedback using shortened TTIs according to a predetermined delay. In TDD configuration 400, DL subframes 405 may include DL TTIs 420, special subframes 410 may include special TTIs 425, and UL subframes 415 may include UL TTIs 430. Different TDD configurations may have a different ordering of DL, UL, and special subframes. In TDD configuration 400, a given TTI may be associated with a subframe number, the number of the TTI within the subframe, and the directionality of the subframe. For example, DL TTI 420-*b* is the second TTI within the ninth subframe (e.g., 9-2) in the downlink direction (e.g., D).

The example illustrated in TDD configuration 400 assumes at least a predetermined delay rule of N+k with k=4. Further, TDD configuration 400 may employ additional delay for UL TTI HARQ feedback balancing. For example, HARQ feedback for DL TTI 420-*a* and DL TTI 420-*b* may be handled by UL TTI 430-*a* and HARQ feedback for DL TTI 420-*d* may be handled by UL TTI 430-*b* similar to the method described in FIG. 3. However, HARQ feedback for DL TTI 420-*c* may have an additional delay (e.g., a delay in addition to an N+k delay) in order to balance the HARQ feedback on the UL TTIs 430 of UL subframe 415-*a*. That is, the HARQ feedback for DL TTI 420-*c* may be handled by UL TTI 430-*b* (e.g., instead of UL TTI 430-*a* according to the N+k rule alone) such that the HARQ feedback on UL TTI 430-*a* and UL TTI 430-*b* is balanced. For example, uplink control messages, such as a low latency PUCCHs, transmitted in UL TTI 430-*a* and UL TTI 430-*b* may have a same payload size or capacity, which may be referred to as balanced size.

Figure 5:
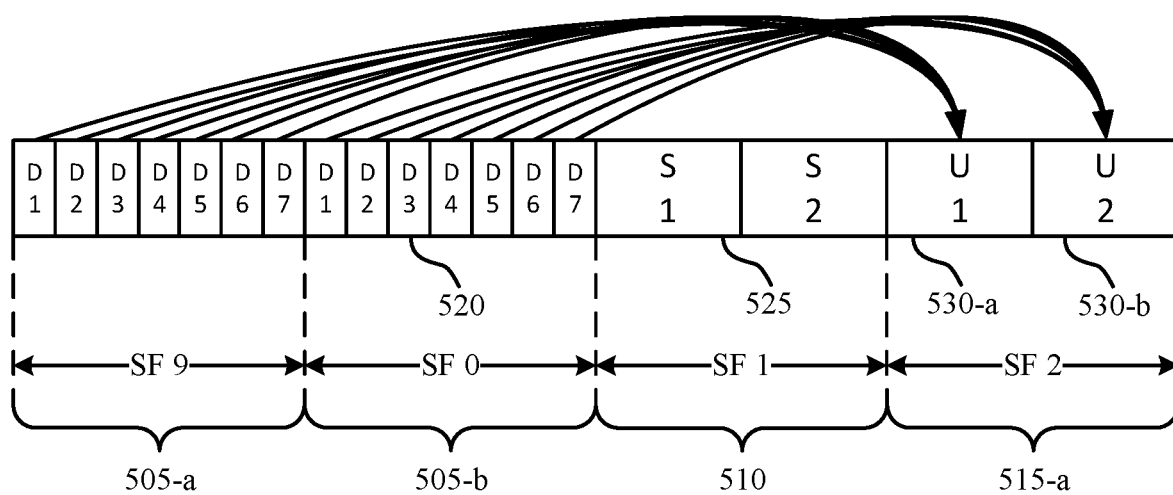

FIG. 5 illustrates an example of a TDD configuration 500 that supports multiple TTI coordination within a TDD configuration in accordance with aspects of the present disclosure. In some cases, TDD configuration 500 may represent aspects of techniques performed by a UE 115 or base station 105 as described with reference to FIGS. 1 and 2.

TDD configuration 500 illustrates balanced HARQ feedback using shortened TTIs of different lengths according to a predetermined delay. In TDD configuration 500, DL subframes 505 may include DL TTIs 520, special subframes 510 may include special TTIs 525, and UL subframes 515 may include UL TTIs 530. Different TDD configurations may have a different ordering of DL, UL, and special subframes. In TDD configuration 500, a given TTI may be associated with a subframe number, the number of the TTI within the subframe, and the directionality of the subframe. For example, DL TTI 520-*b* is the second TTI within the ninth subframe (e.g., 9-2) in the downlink direction (e.g., D). DL TTIs 520 may be two-symbol TTIs while UL TTIs 530 may be slot TTIs.

The example illustrated in TDD configuration 500 assumes at least a predetermined delay rule of N+k with k=4. Further, TDD configuration 500 may employ additional delay for UL TTI HARQ feedback balancing. For example, all DL TTIs 520 (e.g., all 7 DL TTIs 520 for a 14 symbol per subframe configuration) in DL subframe 505-*a* (e.g., subframe 9) may have HARQ feedback handled by UL TTI 530-*a*. HARQ feedback for all DL TTIs 520 in DL subframe 505-*b* may be handled by UL TTI 530-*b*. Accordingly, the HARQ feedback (e.g., ACK/NACK payload) is balanced across the UL TTIs 530 of UL subframe 515-*a* (e.g., subframe 2).

Figure 6:
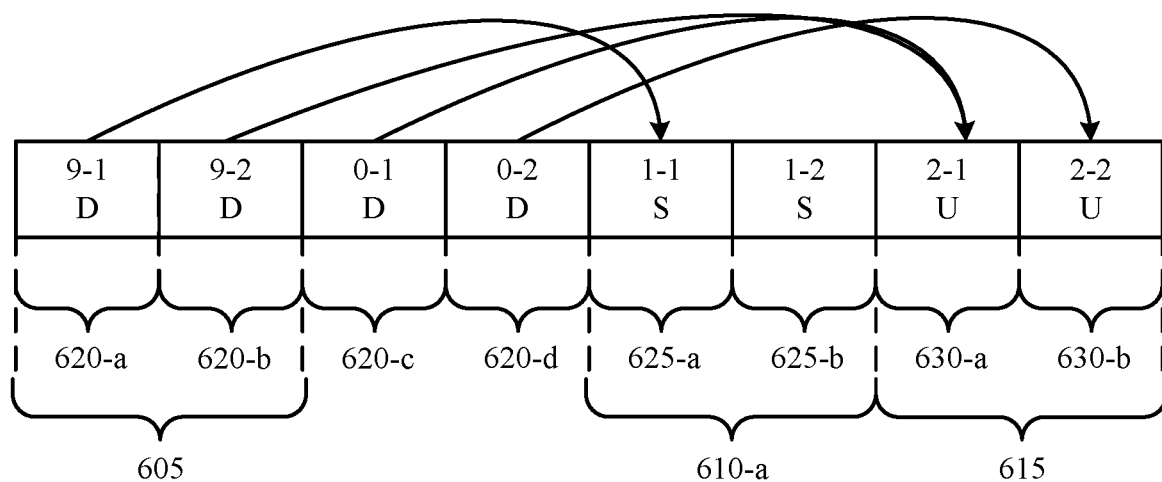

FIG. 6 illustrates an example of a TDD configuration 600 that supports multiple TTI coordination within a TDD configuration in accordance with aspects of the present disclosure. In some cases, TDD configuration 600 may represent aspects of techniques performed by a UE 115 or base station 105 as described with reference to FIGS. 1 and 2.

TDD configuration 600 illustrates HARQ feedback using shortened TTIs according to a predetermined delay with use of special subframe TTIs. In TDD configuration 600, DL subframes 605 may include DL TTIs 620, special subframes 610 may include special TTIs 625, and UL subframes 615 may include UL TTIs 630. Different TDD configurations may have a different ordering of DL, UL, and special subframes. In TDD configuration 600, a given TTI may be associated with a subframe number, the number of the TTI within the subframe, and the directionality of the subframe. For example, DL TTI 620-*b* is the second TTI within the ninth subframe (e.g., 9-2) in the downlink direction (e.g., D).

The example illustrated in TDD configuration 300 assumes a predetermined delay rule of N+k with k=4. Additionally, TDD configuration 600 may allow for use of UL TTIs at the beginning of a special subframe 610. For example, the HARQ feedback for DL TTI 620-*a* may be handled by special TTI 625-*a*. However, special TTI 625-*b* may not be an UL TTI (e.g., UpPTS) and may not be used for HARQ feedback handling. Therefore, a portion of the UL portion of a special subframe 610-*a* may be repurposed, or a prepended region for short TTI (e.g., special TTI 625-*a*) may be added for shortened control or data (e.g., DL TTI 620-*a* HARQ feedback). HARQ feedback for DL TTI 620-*b* and DL TTI 620-*c* may be handled by UL TTI 630-*a*, while HARQ feedback for DL TTI 630-*d* may be handled by UL TTI 630-*b* according to methods described with reference to FIGS. 2-5.

Figure 7:
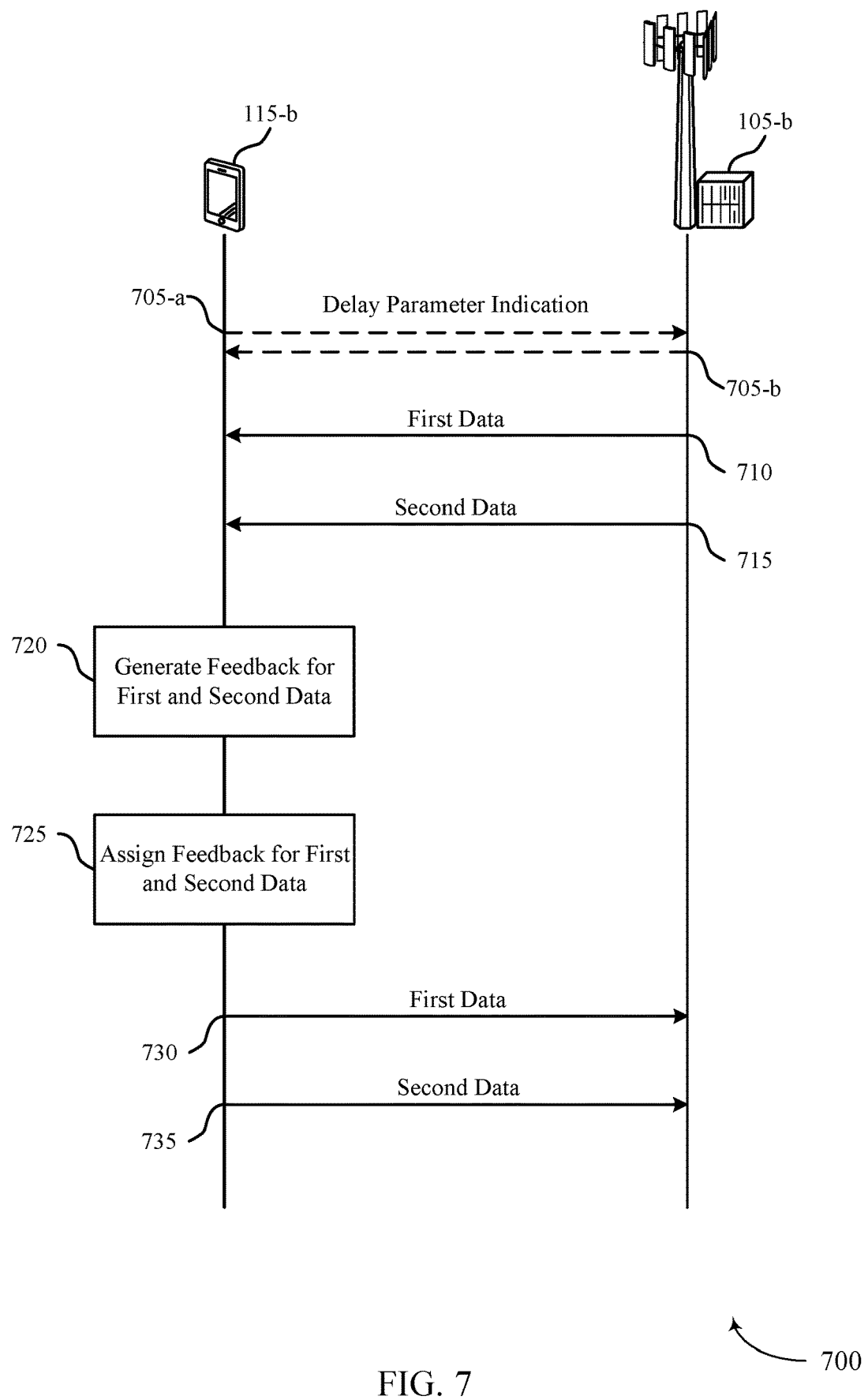
FIGS. 7 and 8 illustrate an example of process flow for multiple TTI coordination within a TDD configuration in accordance with aspects of the present disclosure.

FIG. 7 illustrates an example of process flow 700 for multiple TTI coordination within a TDD configuration in accordance with aspects of the present disclosure. In some cases, process flow 700 may represent aspects of techniques performed by a UE 115 or base station 105 as described with reference to FIGS. 1 and 2. Process flow 700 depicts an example of feedback generation and assigning of UL short TTIs for transmission of feedback.

At 705-*a* UE 115-*b* may optionally transmit an indication of a UE specific delay parameter to base station 105-*b*. Additionally or alternatively, at 705-*b*, base station 105-*b* may optionally transmit an indication of a UE specific parameter. The UE specific parameter may indicate when subsequent data is to be received at UE 115-*b*.

At 710, base station 105-*b* may transmit data during a first TTI. At 715, base station may transmit data during a second TTI. UE 115-*b* may receive the data during the respective first and second DL TTIs (e.g., a slot TTI, two-symbol TTI, etc.). The first and second TTI may be short TTIs and, in some cases, may be within the same subframe. In some cases, the data may be received based on the indication in 705-*a* and/or 705-*b*.

At 720, UE 115-*b* may generate feedback for the data received at 710 and 715. The feedback may be HARQ feedback associated with data received in each of the two TTIs.

At 725, UE 115-*b* may assign feedback associated with each of the two DL TTIs to an UL subframe. The UL subframe may be assigned according to feedback timing associated with the DL TTIs. That is, UL TTIs (e.g., a slot TTI, two-symbol TTI, etc.) within the UL subframe may be assigned according to the location of the DL TTI the data was received in. In some cases, the UL TTIs may be assigned to balance the payload of the feedback or messages associated with the data received in the two DL TTIs. That is, each UL TTI may be assigned feedback associated with the same number of DL TTIs.

At 730, UE 115-*b* may transmit the first data to base station 105-*b* during the UL TTI assigned in 725. At 735, UE 115-*b* may transmit the second data to base station 105-*b* during the UL TTI assigned at 725.

Figure 8:
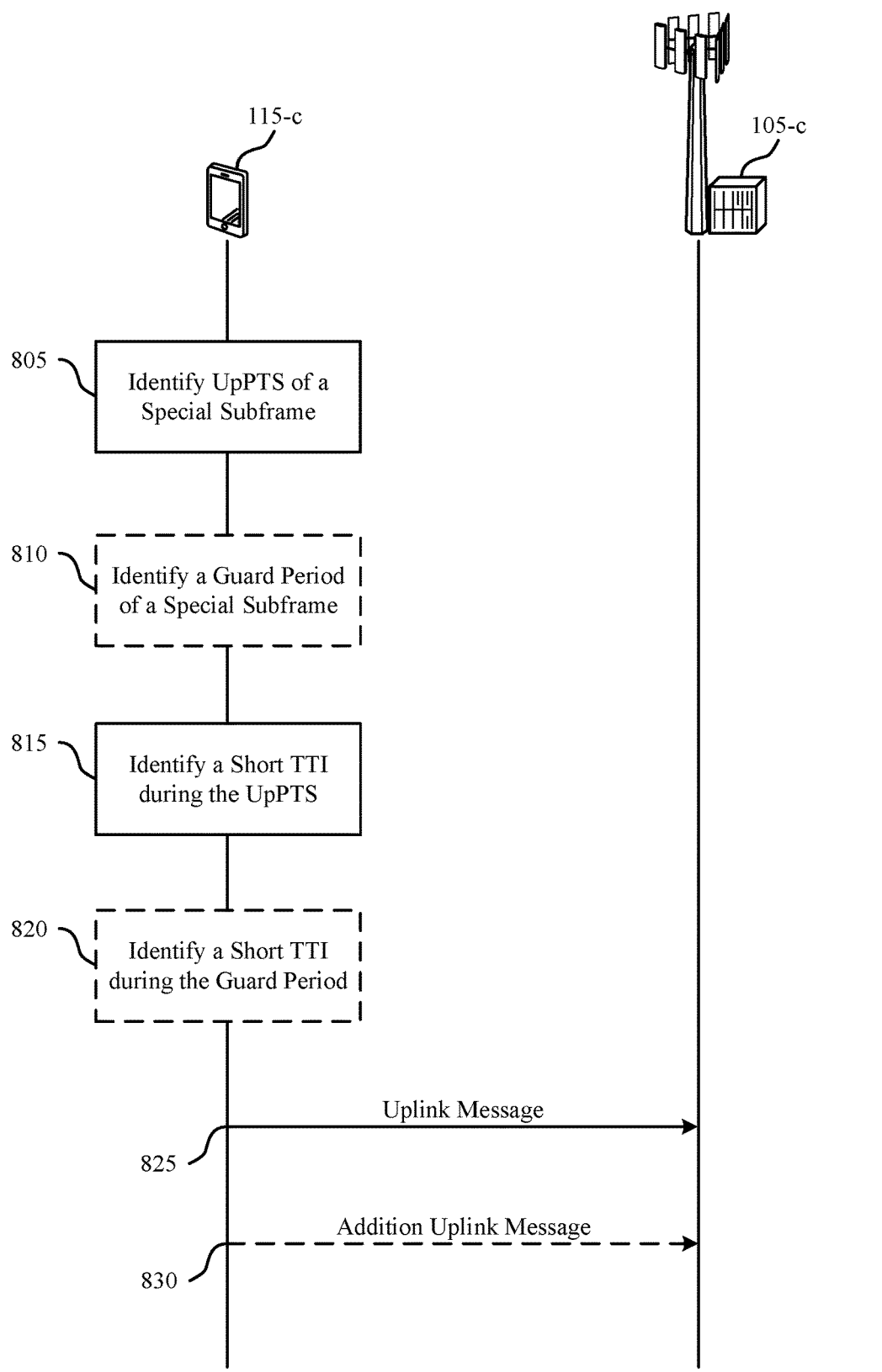

FIG. 8 illustrates an example of process flow 800 for multiple TTI coordination within a TDD configuration in accordance with aspects of the present disclosure. In some cases, process flow 800 may represent aspects of techniques performed by a UE 115 or base station 105 as described with reference to FIGS. 1 and 2. Process flow 800 depicts an example of identifying and using short TTIs within a special subframe for feedback reporting.

At 805, UE 115-*c* may identify a UpPTS of a special subframe. Optionally, at 810, UE 115-*c* may identify a guard period of a special subframe.

At 815, UE 115-*c* may identify a short TTI during the UpPTS. Optionally, at 820, UE 115-*c* may identify a short TTI during the guard period.

At 825, UE 115-*c* may transmit an UL message during the TTI of the UpPTS. In some cases, the UL message of 825 may be transmitted during a TTI that includes a portion of the UpPTS and a portion of an UL TTI. Optionally, at 830, UE 115-*c* may transmit an UL message during the TTI of the guard period.

Figure 9:
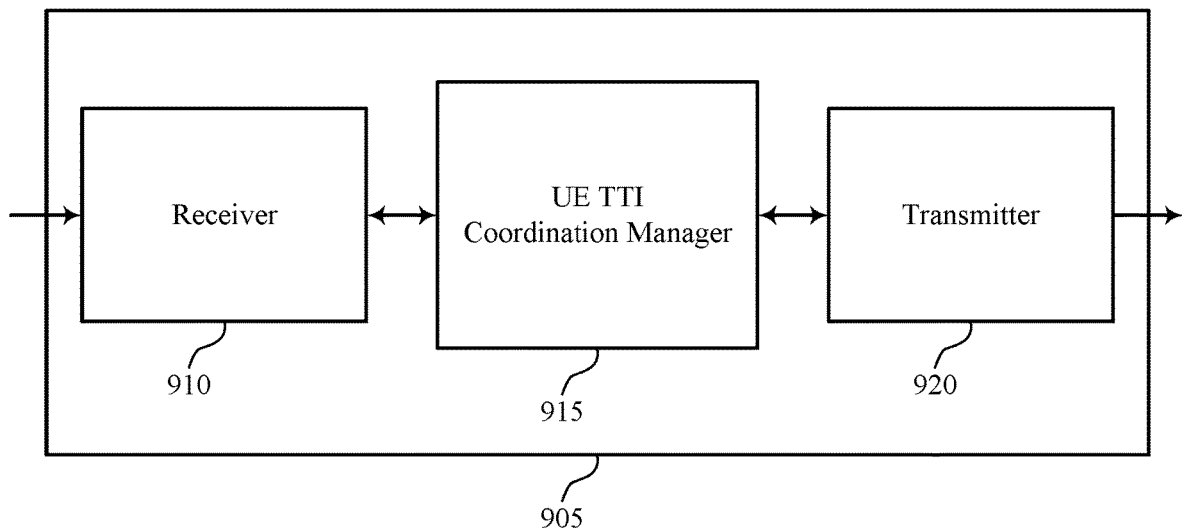
FIGS. 9 through 11 show block diagrams of a device that supports multiple TTI coordination within a TDD configuration in accordance with aspects of the present disclosure.

FIG. 9 shows a block diagram 900 of a device 905 that supports multiple TTI coordination within a TDD configuration in accordance with various aspects of the present disclosure. Device 905 may be an example of aspects of a UE 115 as described with reference to FIGS. 1 and 2. Device 905 may include receiver 910, UE TTI coordination manager 915, and transmitter 920. Device 905 may also include a processor. Each of these components may be in communication with one another (e.g., via one or more buses).

Receiver 910 may receive information such as packets, user data, or control information associated with various information channels (e.g., control channels, data channels, and information related to multiple TTI coordination within a TDD configuration, etc.). Information may be passed on to other components of the device. The receiver 910 may be an example of aspects of the transceiver 1240 as described with reference to FIG. 12. Receiver 910 may receive first data during a first TTI of the second duration and second data during a second TTI of the second duration. In some cases, the first duration is one LTE subframe. In some cases, the second duration is one LTE slot. In some cases, the second duration is two LTE symbol periods.

UE TTI coordination manager 915 may generate first feedback for the first data and second feedback for the second data, assign the first feedback and the second feedback to an uplink TTI of the first duration in the TDD configuration based on a feedback timing associated with TTIs of the second duration, identify an UpPTS of a special TTI of the first duration in the TDD configuration, and identify a TTI of the second duration during the UpPTS.

Transmitter 920 may transmit signals generated by other components of the device. In some examples, the transmitter 920 may be collocated with a receiver 910 in a transceiver module. For example, the transmitter 920 may be an example of aspects of the transceiver 1240 as described with reference to FIG. 12. The transmitter 920 may include a single antenna, or it may include a set of antennas. Transmitter 920 may transmit the first feedback and the second feedback during the uplink TTI of the first duration, transmit an uplink message during the TTI of the second duration, transmit an additional uplink message during the additional TTI of the second duration, and transmit an uplink message during a time period that includes a portion of the UpPTS and a portion of an uplink TTI of the first duration in the TDD subframe configuration.

Figure 10:
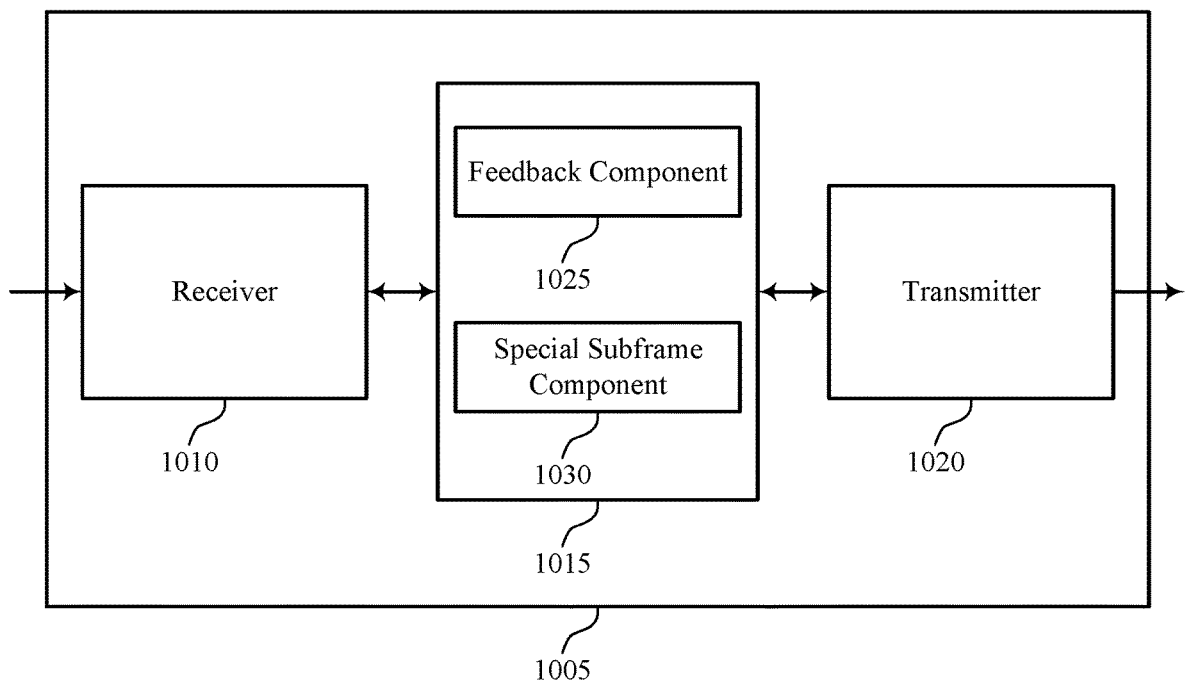

FIG. 10 shows a block diagram 1000 of a device 1005 that supports multiple TTI coordination within a TDD configuration in accordance with various aspects of the present disclosure. Device 1005 may be an example of aspects of a device 905 or a UE 115 as described with reference to FIGS. 1, 2 and 9. Device 1005 may include receiver 1010, UE TTI coordination manager 1015, and transmitter 1020. Device 1005 may also include a processor. Each of these components may be in communication with one another (e.g., via one or more buses).

Receiver 1010 may receive information such as packets, user data, or control information associated with various information channels (e.g., control channels, data channels, and information related to multiple TTI coordination within a TDD configuration, etc.). Information may be passed on to other components of the device. The receiver 1010 may be an example of aspects of the transceiver 1240 as described with reference to FIG. 12.

UE TTI coordination manager 1015 may be an example of aspects of the UE TTI coordination manager 915 as described with reference to FIG. 9. UE TTI coordination manager 1015 may also include feedback component 1025 and special subframe component 1030.

Feedback component 1025 may generate first feedback for the first data and second feedback for the second data and assign the first feedback and the second feedback to an uplink TTI of the first duration in the TDD configuration based on a feedback timing associated with TTIs of the second duration. Special subframe component 1030 may identify an UpPTS of a special TTI of the first duration in the TDD configuration and identify a TTI of the second duration during the UpPTS.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1240 as described with reference to FIG. 12. The transmitter 1020 may include a single antenna, or it may include a set of antennas.

Figure 11:
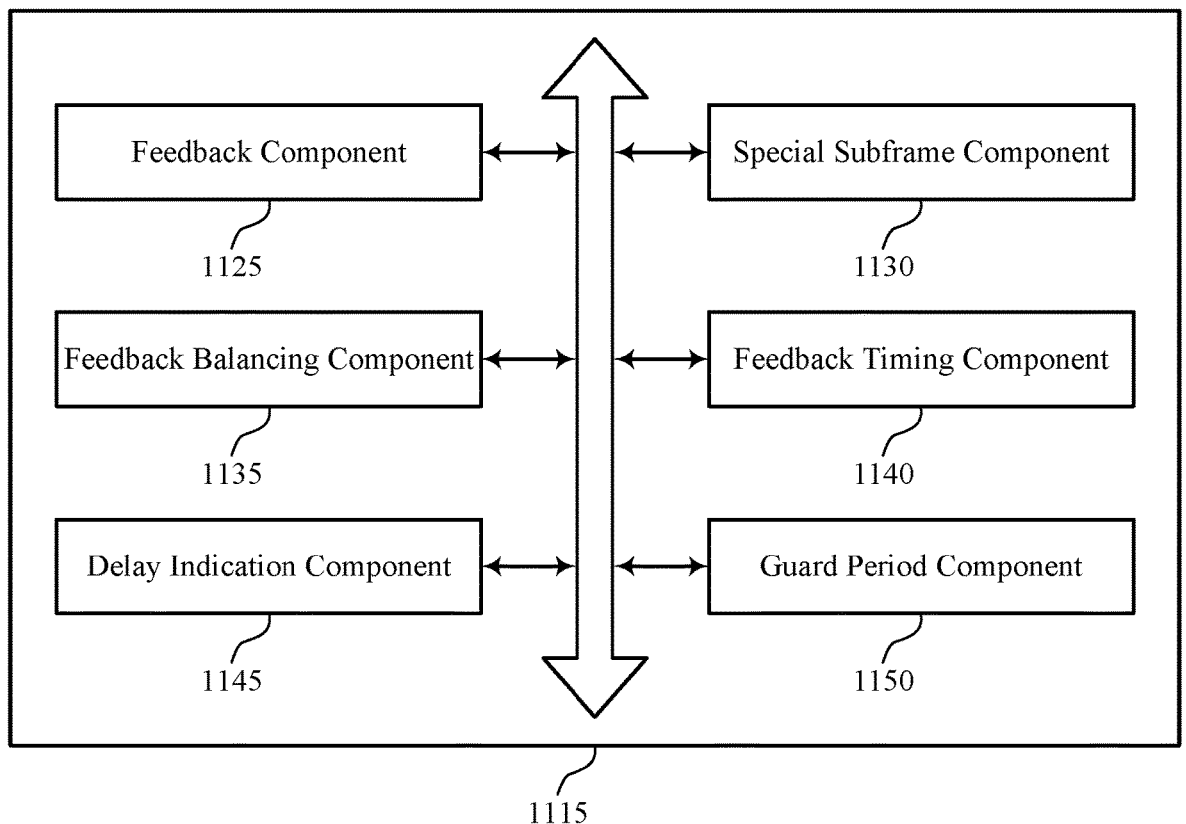

FIG. 11 shows a block diagram 1100 of a UE TTI coordination manager 1115 that supports multiple TTI coordination within a TDD configuration in accordance with various aspects of the present disclosure. The UE TTI coordination manager 1115 may be an example of aspects of a UE TTI coordination manager 915, a UE TTI coordination manager 1015, or a UE TTI coordination manager 915 as described with reference to FIGS. 9 and 10. The UE TTI coordination manager 1115 may include feedback component 1125 and special subframe component 1130. Each of these modules may communicate, directly or indirectly, with one another (e.g., via one or more buses).

Feedback component 1125 may generate first feedback for the first data and second feedback for the second data and assign the first feedback and the second feedback to an uplink TTI of the first duration in the TDD configuration based on a feedback timing associated with TTIs of the second duration. Special subframe component 1130 may identify an UpPTS of a special TTI of the first duration in the TDD configuration and identify a TTI of the second duration during the UpPTS.

Feedback balancing component 1135 may identify a first portion of the uplink TTI of the first duration based on a location of the first TTI of the second duration, where the first feedback is transmitted in a first uplink message during the first portion of the uplink TTI of the first duration and identify a second portion of the uplink TTI of the first duration based on a location of the second TTI of the second duration, where the second feedback is transmitted in a second uplink message during the second portion of the uplink TTI of the first duration. In some cases, a payload size of the first uplink message and a payload size of the second uplink message are balanced.

In some cases, the location of the first TTI of the second duration includes a first downlink TTI of the first duration in the TDD configuration and the location of the second TTI of the second duration includes a second downlink TTI of the first duration in the TDD configuration, and where the first portion of the uplink TTI of the first duration is designated for feedback associated with the first downlink TTI of the first duration and the second portion of the uplink TTI of the first duration is designated for feedback associated with the second downlink TTI of the first duration. In some cases, the first portion and the second portion of the uplink TTI of the first duration are designated for feedback associated with a same number of TTIs of the second duration.

Feedback timing component 1140 may identify a timer period for transmitting feedback. In some cases, the feedback timing associated with TTIs of the second duration is an integer multiple of TTIs of the second duration.

Delay indication component 1145 may transmit an indication of a UE specific delay parameter to a base station, where the first data or the second data is received based on the UE specific delay parameter and receive an indication of a UE specific delay parameter from a base station, where the first data or the second data is received based on the UE specific delay parameter. Guard period component 1150 may identify a guard period during the special TTI of the first duration and identify an additional TTI of the second duration during the guard period.

Figure 12:
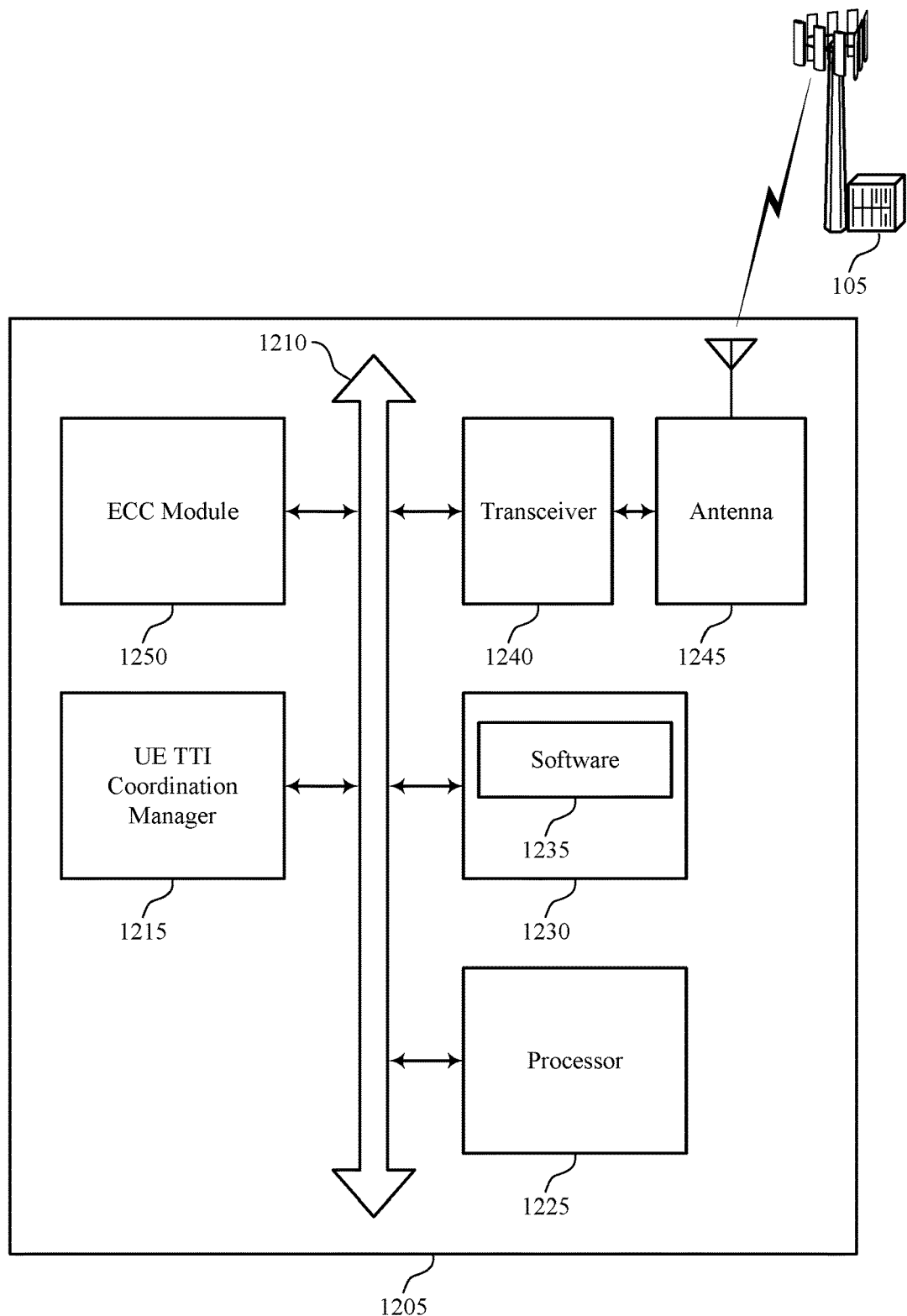
FIG. 12 illustrates a block diagram of a system including a user equipment (UE) that supports multiple TTI coordination within a TDD configuration in accordance with aspects of the present disclosure.

FIG. 12 shows a diagram of a system 1200 including a device 1205 that supports multiple TTI coordination within a TDD configuration in accordance with various aspects of the present disclosure. Device 1205 may be an example of a device 905, device 1005, or a UE 115 as described above, e.g., with reference to FIGS. 1, 2, 9 and 10.

Device 1205 may include components for bi-directional voice and data communications including components for transmitting and receiving communications, including UE TTI coordination manager 1215, processor 1225, memory 1230, software 1235, transceiver 1240, antenna 1245, and eCC module 1250.

Processor 1225 may include an intelligent hardware device, (e.g., a central processing unit (CPU), a microcontroller, an application specific integrated circuit (ASIC), etc.) Memory 1230 may include random access memory (RAM) and read only memory (f). The memory 1230 may store computer-readable, computer-executable software 1235 including instructions that, when executed, cause the processor to perform various functions described herein. In some cases, the memory 1230 can contain, among other things, a Basic Input-Output system (BIOS) which may control basic hardware and/or software operation such as the interaction with peripheral components or devices.

Software 1235 may include code to implement aspects of the present disclosure, including code to support multiple TTI coordination within a TDD configuration. Software 1235 can be stored in a non-transitory computer-readable medium such as system memory or other memory. In some cases, the software 1235 may not be directly executable by the processor but may cause a computer (e.g., when compiled and executed) to perform functions described herein.

Transceiver 1240 may communicate bi-directionally, via one or more antennas, wired, or wireless links as described above. For example, the transceiver 1240 may represent a wireless transceiver and may communicate bi-directionally with another wireless transceiver. The transceiver 1240 may also include a modem to modulate the packets and provide the modulated packets to the antennas for transmission, and to demodulate packets received from the antennas. In some cases, the wireless device may include a single antenna 1245. However, in some cases the device may have more than one antenna 1245, which may be capable of concurrently transmitting or receiving multiple wireless transmissions.

eCC module 1250 may enable operations using enhanced component carriers (eCCs) including operations using low latency TTIs and operations in unlicensed spectrum.

Figure 13:
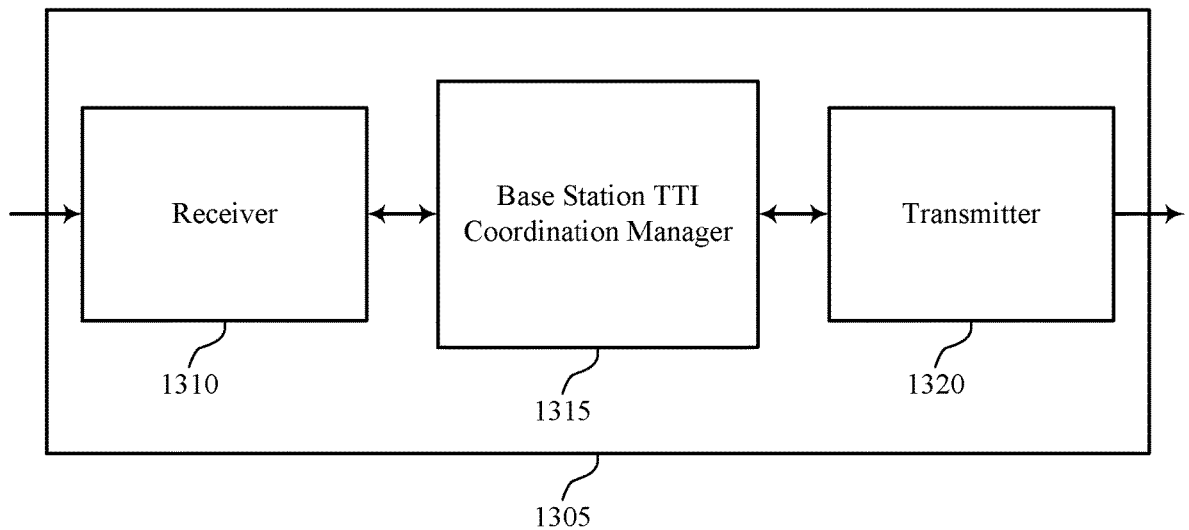
FIGS. 13 through 15 show block diagrams of a device or devices that support multiple TTI coordination within a TDD configuration in accordance with aspects of the present disclosure.

FIG. 13 shows a block diagram 1300 of a device 1305 that supports multiple TTI coordination within a TDD configuration in accordance with various aspects of the present disclosure. Device 1305 may be an example of aspects of a base station 105 as described with reference to FIGS. 1 and 2. Device 1305 may include receiver 1310, base station TTI coordination manager 1315, and transmitter 1320. Device 1305 may also include a processor. Each of these components may be in communication with one another (e.g., via one or more buses).

Receiver 1310 may receive information such as packets, user data, or control information associated with various information channels (e.g., control channels, data channels, and information related to multiple TTI coordination within a TDD configuration, etc.). Information may be passed on to other components of the device. The receiver 1310 may be an example of aspects of the transceiver 1240 as described with reference to FIG. 12. Receiver 1310 may receive first feedback for the first data and second feedback for the second data during the uplink TTI of the first duration and receive an uplink control or data message during the TTI of the second duration from a first UE.

Base station TTI coordination manager 1315 may be an example of aspects of the base station TTI coordination manager 1615 as described with reference to FIG. 16. Base station TTI coordination manager 1315 may identify an uplink TTI of the first duration in the TDD configuration based on a feedback timing associated with TTIs of the second duration, restrict one or more TTIs of the first duration in the TDD configuration for communication with a subset of user equipment (UEs) in the system based on a delay metric, schedule the subset of UEs according to the restriction of the one or more TTIs of the first duration, identify an UpPTS of a special TTI of the first duration in the TDD configuration, and identify a TTI of the second duration during the UpPTS.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1240 as described with reference to FIG. 12. The transmitter 1320 may include a single antenna, or it may include a set of antennas. Transmitter 1320 may transmit first data during a first TTI of the second duration and second data during a second TTI of the second duration and communicate with the subset of UEs in one or more TTIs of the second duration based on the scheduling.

Figure 14:
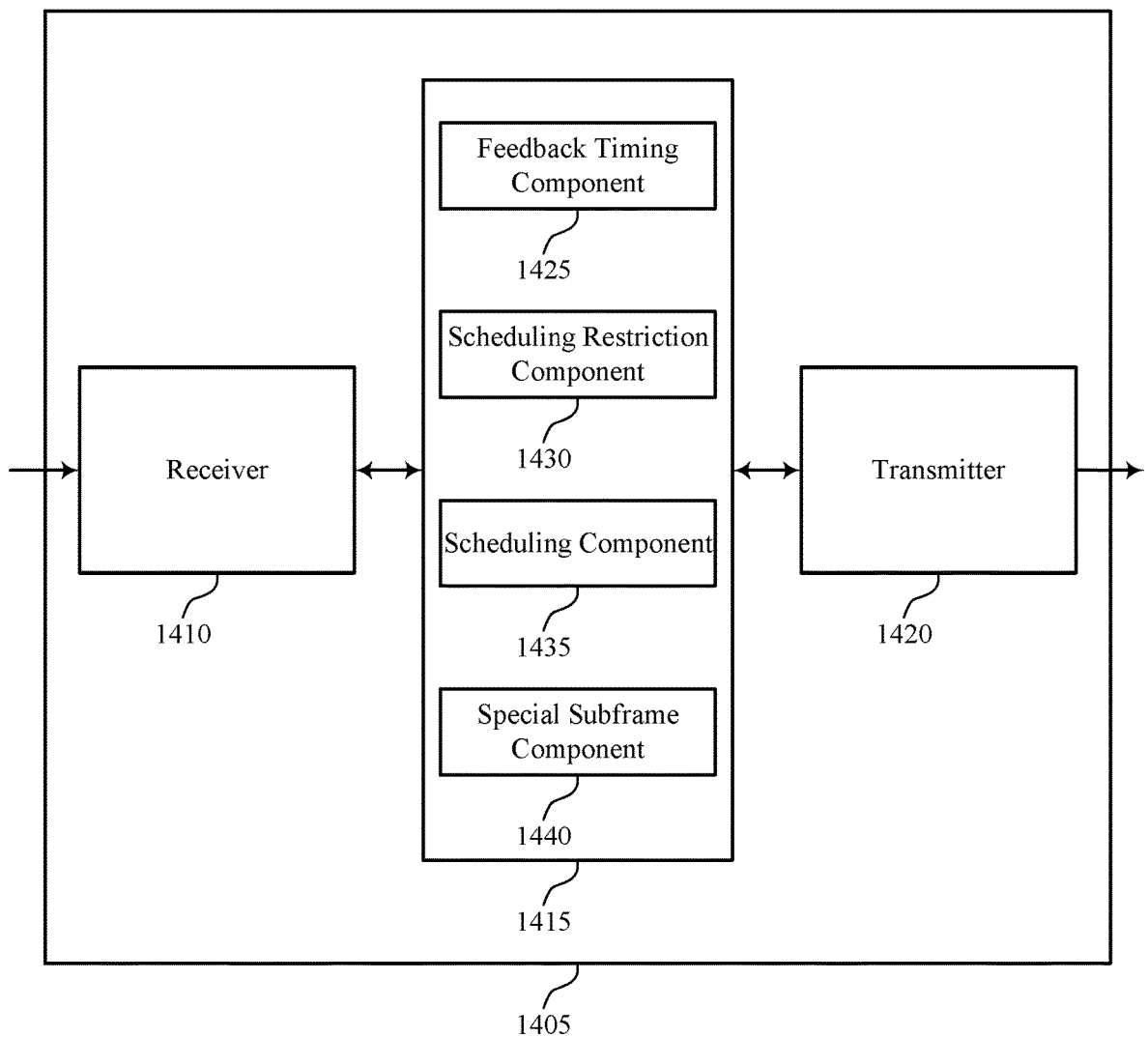

FIG. 14 shows a block diagram 1400 of a device 1405 that supports multiple TTI coordination within a TDD configuration in accordance with various aspects of the present disclosure. Device 1405 may be an example of aspects of a device 1305 or a base station 105 as described with reference to FIGS. 1, 2 and 13. Device 1405 may include receiver 1410, base station TTI coordination manager 1415, and transmitter 1420. Device 1405 may also include a processor. Each of these components may be in communication with one another (e.g., via one or more buses).

Receiver 1410 may receive information such as packets, user data, or control information associated with various information channels (e.g., control channels, data channels, and information related to multiple TTI coordination within a TDD configuration, etc.). Information may be passed on to other components of the device. The receiver 1410 may be an example of aspects of the transceiver 1240 as described with reference to FIG. 12.

Base station TTI coordination manager 1415 may be an example of aspects of the base station TTI coordination manager 1615 as described with reference to FIG. 16. Base station TTI coordination manager 1415 may also include feedback timing component 1425, scheduling restriction component 1430, scheduling component 1435, and special subframe component 1440.

Feedback timing component 1425 may identify an uplink TTI of the first duration in the TDD configuration based on a feedback timing associated with TTIs of the second duration.

Scheduling restriction component 1430 may restrict one or more TTIs of the first duration in the TDD configuration for communication with a subset of user equipment (UEs) in the system based on a delay metric. In some cases, the delay metric includes at least one of a timing advance parameter, a location parameter, a processing speed parameter, a UE category, or a modulation and coding scheme parameter, or any combination thereof. Scheduling component 1435 may schedule the subset of UEs according to the restriction of the one or more TTIs of the first duration.

Special subframe component 1440 may identify an UpPTS of a special TTI of the first duration in the TDD configuration and identify a TTI of the second duration during the UpPTS.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1240 as described with reference to FIG. 12. The transmitter 1420 may include a single antenna, or it may include a set of antennas.

Figure 15:
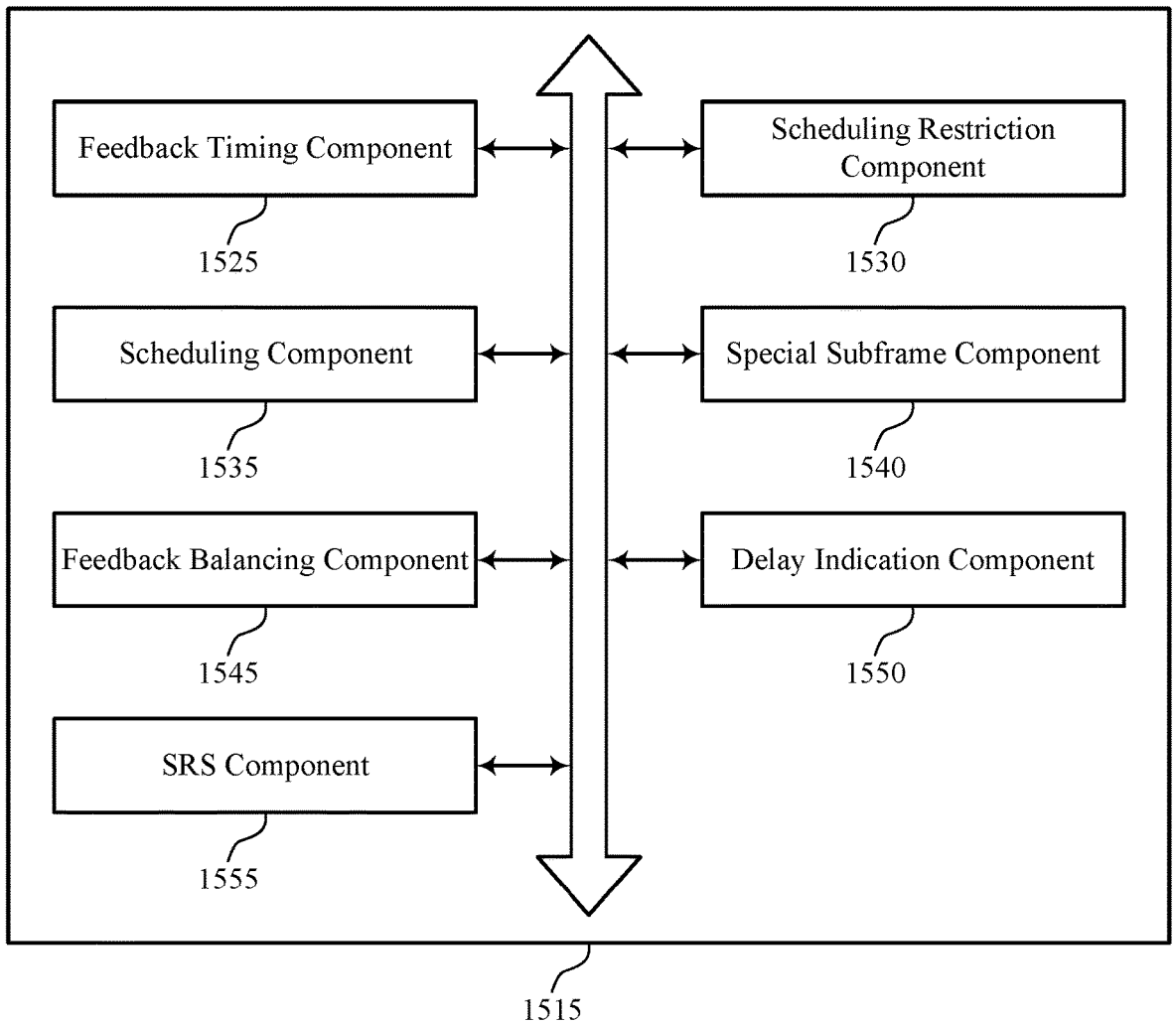

FIG. 15 shows a block diagram 1500 of a base station TTI coordination manager 1515 that supports multiple TTI coordination within a TDD configuration in accordance with various aspects of the present disclosure. The base station TTI coordination manager 1515 may be an example of aspects of a base station TTI coordination manager 1315, a base station TTI coordination manager 1415, or a base station TTI coordination manager 1615 as described with reference to FIGS. 13, 14, and 16. The base station TTI coordination manager 1515 may include feedback timing component 1525, scheduling restriction component 1530, scheduling component 1535, and special subframe component 1540. Each of these modules may communicate, directly or indirectly, with one another (e.g., via one or more buses).

Feedback timing component 1525 may identify an uplink TTI of the first duration in the TDD configuration based on a feedback timing associated with TTIs of the second duration.

Scheduling restriction component 1530 may restrict one or more TTIs of the first duration in the TDD configuration for communication with a subset of user equipment (UEs) in the system based on a delay metric. In some cases, the delay metric includes at least one of a timing advance parameter, a location parameter, a processing speed parameter, a UE category, or a modulation and coding scheme parameter, or any combination thereof. Scheduling component 1535 may schedule the subset of UEs according to the restriction of the one or more TTIs of the first duration.

Special subframe component 1540 may identify an UpPTS of a special TTI of the first duration in the TDD configuration and identify a TTI of the second duration during the UpPTS.

Feedback balancing component 1545 may identify a first portion of the uplink TTI of the first duration based on a location of the first TTI of the second duration, where the first feedback is received in a first uplink message during the first portion of the uplink TTI of the first duration and identify a second portion of the uplink TTI of the first duration based on a location of the second TTI of the second duration, where the second feedback is received in a second uplink message during the second portion of the uplink TTI of the first duration.

In some cases, a payload size of the first uplink message and a payload size of the second uplink message are balanced. In some cases, the location of the first TTI of the second duration includes a first downlink TTI of the first duration in the TDD configuration and the location of the second TTI of the second duration includes a second downlink TTI of the first duration in the TDD configuration, and where the first portion of the uplink TTI of the first duration is designated for feedback associated with the first downlink TTI of the first duration and the second portion of the uplink TTI of the first duration is designated for feedback associated with the second downlink TTI of the first duration.

Delay indication component 1550 may receive an indication of a UE specific delay parameter from a UE, where the first data or the second data is transmitted based on the UE specific delay parameter and transmit an indication of a UE specific delay parameter to a UE, where the first data or the second data is transmitted based on the UE specific delay parameter. In some cases, the UE specific delay parameter includes a timing advance parameter, a location parameter, a processing speed parameter, a UE category, or a modulation and coding scheme parameter.

SRS component 1555 may receive a SRS from a second UE during the UpPTS, second UE is communicating according to TTIs of the first duration, and where the uplink control or data message from the first UE is multiplexed with the SRS from the second UE.

Figure 16:
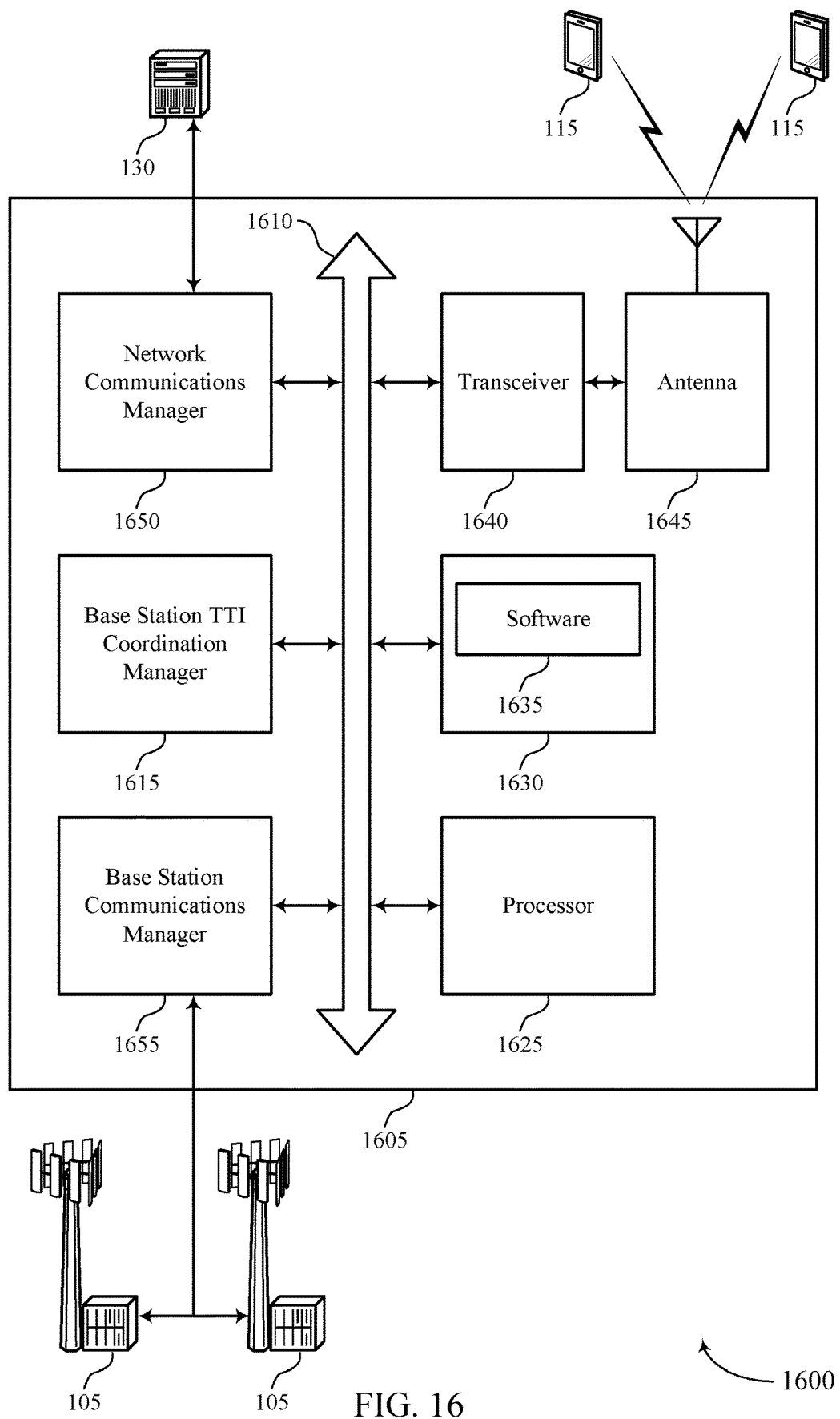
FIG. 16 illustrates a block diagram of a system including a device that supports multiple TTI coordination within a TDD configuration in accordance with aspects of the present disclosure.

FIG. 16 illustrates a block diagram of a system 1600 including a device 1605 that supports multiple TTI coordination within a TDD configuration in accordance with various aspects of the present disclosure. Device 1605 may be an example of a device 1305, device 1405, or a base station 105 as described above, e.g., with reference to FIGS. 1, 2, 13 and 14.

Device 1605 may include components for bi-directional voice and data communications including components for transmitting and receiving communications, including base station TTI coordination manager 1615, processor 1625, memory 1630, software 1635, transceiver 1640, antenna 1645, network communications manager 1650, and base station communications manager 1655.

Processor 1625 may include an intelligent hardware device, (e.g., a CPU, a microcontroller, an ASIC, etc.) Memory 1630 may include RAM and ROM. The memory 1630 may store computer-readable, computer-executable software 1635 including instructions that, when executed, cause the processor to perform various functions described herein. In some cases, the memory 1630 can contain, among other things, a BIOS which may control basic hardware and/or software operation such as the interaction with peripheral components or devices.

Software 1635 may include code to implement aspects of the present disclosure, including code to support multiple TTI coordination within a TDD configuration. Software 1635 can be stored in a non-transitory computer-readable medium such as system memory or other memory. In some cases, the software 1635 may not be directly executable by the processor but may cause a computer (e.g., when compiled and executed) to perform functions described herein.

Transceiver 1640 may communicate bi-directionally, via one or more antennas, wired, or wireless links as described above. For example, the transceiver 1640 may represent a wireless transceiver and may communicate bi-directionally with another wireless transceiver. The transceiver 1640 may also include a modem to modulate the packets and provide the modulated packets to the antennas for transmission, and to demodulate packets received from the antennas. In some cases, the wireless device may include a single antenna 1645. However, in some cases the device may have more than one antenna 1645, which may be capable of concurrently transmitting or receiving multiple wireless transmissions.

Network communications manager 1650 may manage communications with the core network (e.g., via one or more wired backhaul links). For example, the network communications manager 1650 may manage the transfer of data communications for client devices, such as one or more UEs 115.

Base station communications manager 1655 may manage communications with other base station 105, and may include a controller or scheduler for controlling communications with UEs 115 in cooperation with other base stations 105. For example, the base station communications manager 1655 may coordinate scheduling for transmissions to UEs 115 for various interference mitigation techniques such as beamforming or joint transmission. In some examples, base station communications manager 1655 may provide an X2 interface within an LTE/LTE-A wireless communication network technology to provide communication between base stations 105.

Figure 17:
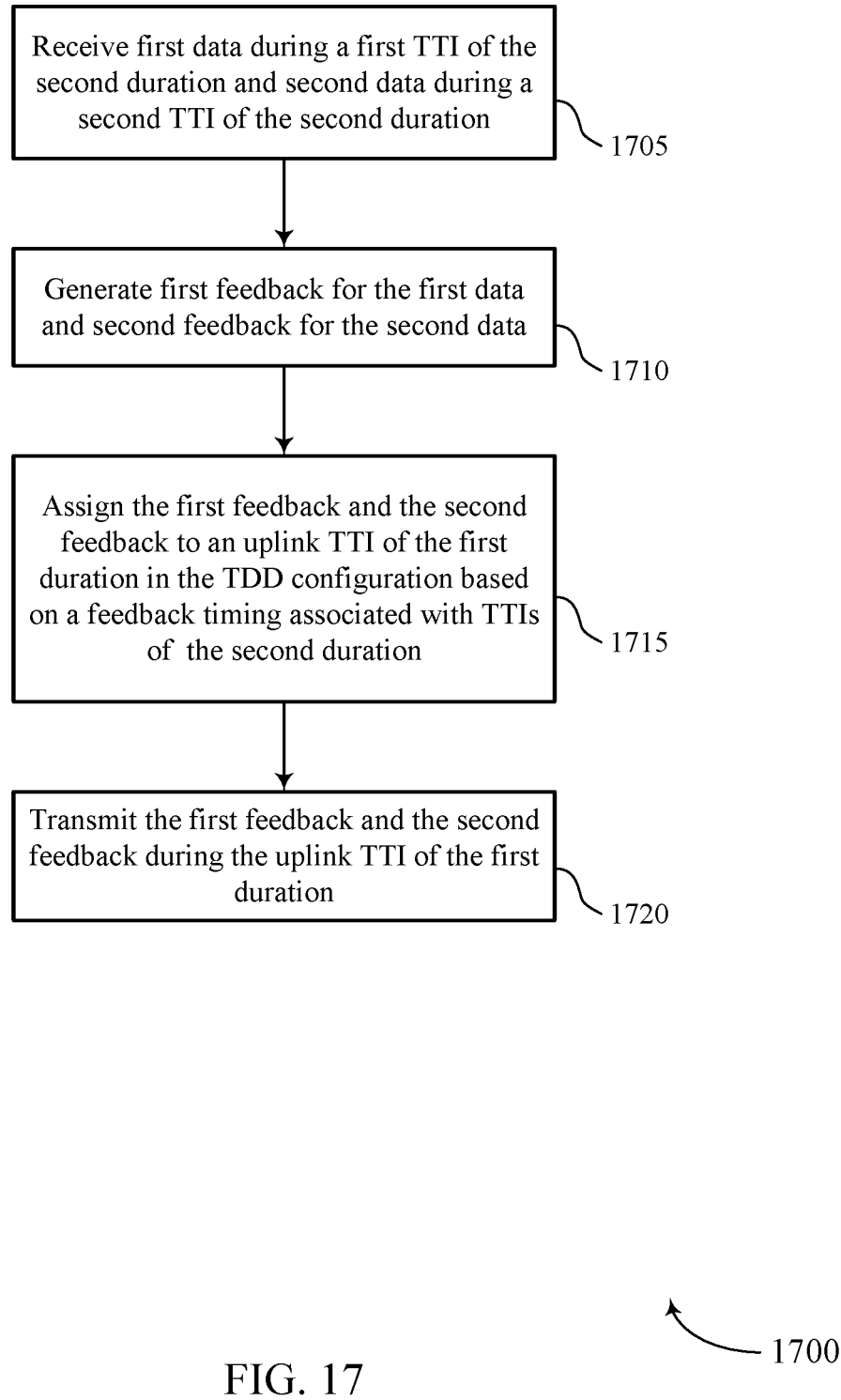
FIGS. 17 through 21 show flowcharts illustrating methods for multiple TTI coordination within a TDD configuration in accordance with aspects of the present disclosure.

FIG. 17 shows a flowchart illustrating a method 1700 for multiple TTI coordination within a TDD configuration in accordance with various aspects of the present disclosure. The operations of method 1700 may be implemented by a UE 115 or its components as described herein. For example, the operations of method 1700 may be performed by a UE TTI coordination manager as described with reference to FIGS. 9 through 11. In some examples, a UE 115 may execute a set of codes to control the functional elements of the device to perform the functions described below. Additionally or alternatively, the UE 115 may perform aspects the functions described below using special-purpose hardware.

At block 1705, the UE 115 may receive first data during a first TTI of the second duration and second data during a second TTI of the second duration. The operations of block 1705 may be performed according to the methods as described with reference to FIG. 2. In some examples, aspects of the operations of block 1705 may be performed by a receiver as described with reference to FIGS. 9 through 11.

At block 1710, the UE 115 may generate first feedback for the first data and second feedback for the second data. The operations of block 1710 may be performed according to the methods as described with reference to FIG. 2. In some examples, aspects of the operations of block 1710 may be performed by a feedback component as described with reference to FIGS. 9 through 11.

At block 1715, the UE 115 may assign the first feedback and the second feedback to an uplink TTI of the first duration in the TDD configuration based on a feedback timing associated with TTIs of the second duration. The operations of block 1715 may be performed according to the methods as described with reference to FIG. 2. In some examples, aspects of the operations of block 1715 may be performed by a feedback component as described with reference to FIGS. 9 through 11.

At block 1720, the UE 115 may transmit the first feedback and the second feedback during the uplink TTI of the first duration. The operations of block 1720 may be performed according to the methods as described with reference to FIG.

2. In some examples, aspects of the operations of block 1720 may be performed by a transmitter as described with reference to FIGS. 9 through 11.

Figure 18:
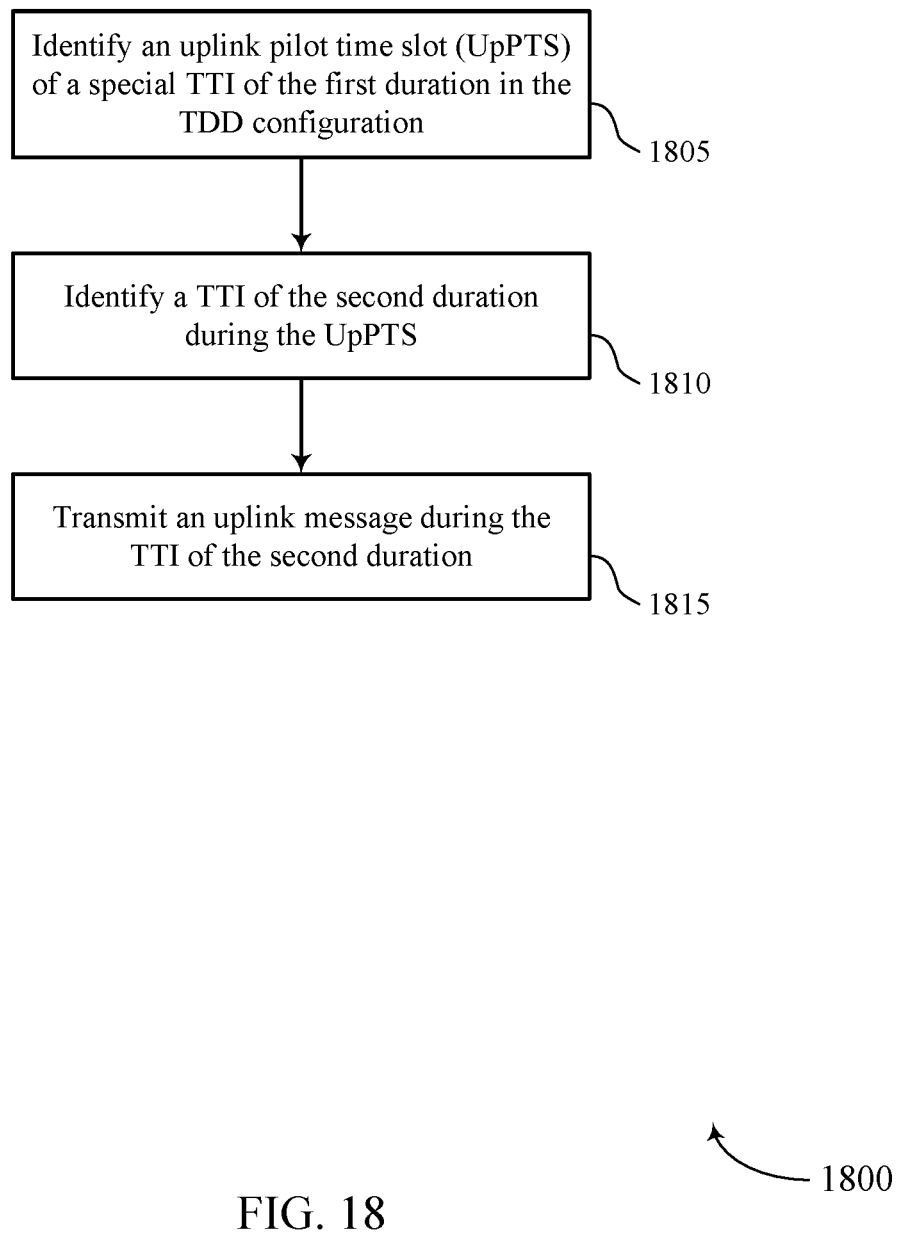

FIG. 18 shows a flowchart illustrating a method 1800 for multiple TTI coordination within a TDD configuration in accordance with various aspects of the present disclosure. The operations of method 1800 may be implemented by a UE 115 or its components as described herein. For example, the operations of method 1800 may be performed by a UE TTI coordination manager as described with reference to FIGS. 9 through 11. In some examples, a UE 115 may execute a set of codes to control the functional elements of the device to perform the functions described below. Additionally or alternatively, the UE 115 may perform aspects the functions described below using special-purpose hardware.

At block 1805, the UE 115 may identify an UpPTS of a special TTI of the first duration in the TDD configuration. The operations of block 1805 may be performed according to the methods as described with reference to FIG. 2. In some examples, aspects of the operations of block 1805 may be performed by a special subframe component as described with reference to FIGS. 9 through 11.

At block 1810, the UE 115 may identify a TTI of the second duration during the UpPTS. The operations of block 1810 may be performed according to the methods as described with reference to FIG. 2. In some examples, aspects of the operations of block 1810 may be performed by a special subframe component as described with reference to FIGS. 9 through 11.

At block 1815, the UE 115 may transmit an uplink message during the TTI of the second duration. The operations of block 1815 may be performed according to the methods as described with reference to FIG. 2. In some examples, aspects of the operations of block 1815 may be performed by a transmitter as described with reference to FIGS. 9 through 11.

Figure 19:
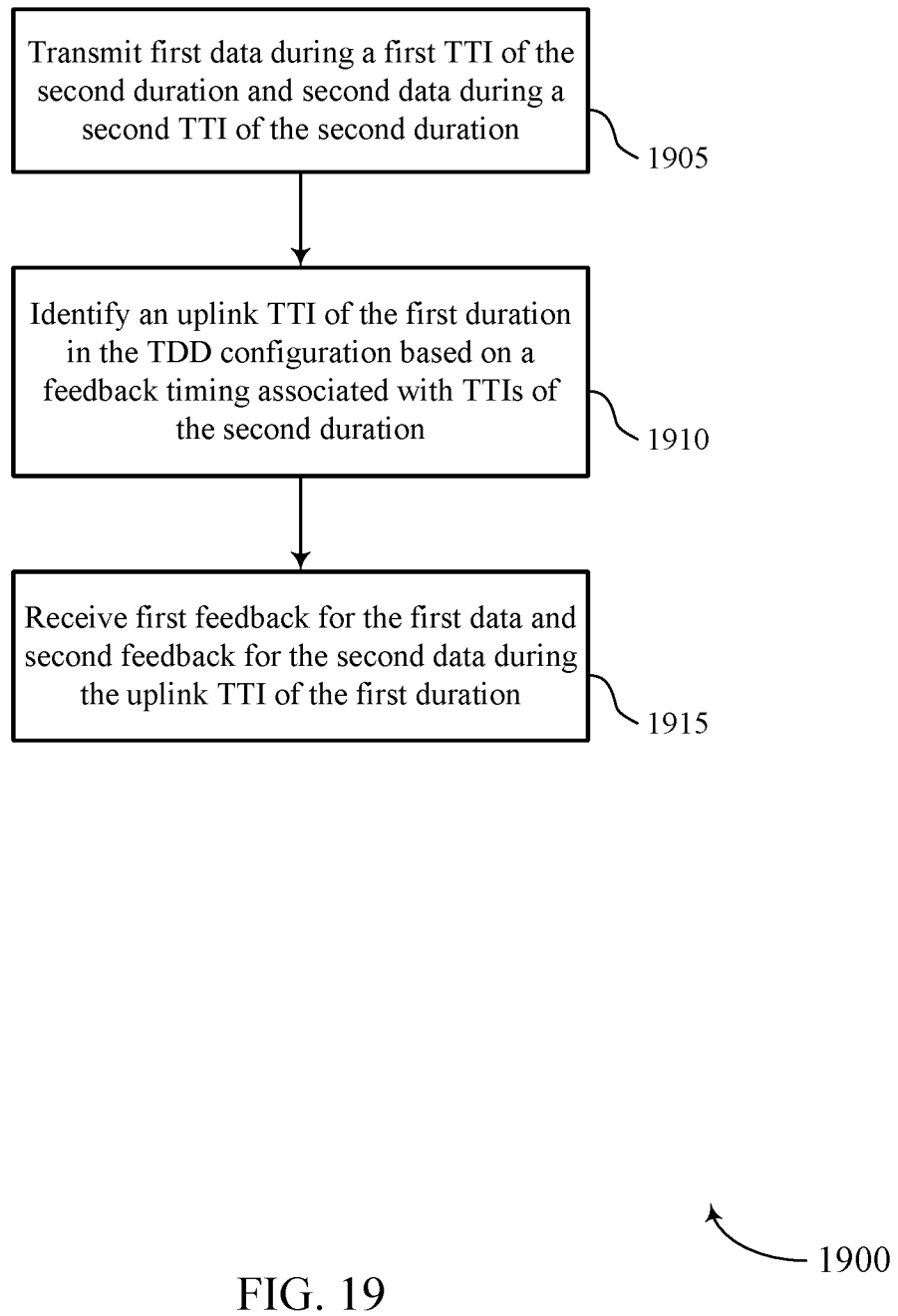

FIG. 19 shows a flowchart illustrating a method 1900 for multiple TTI coordination within a TDD configuration in accordance with various aspects of the present disclosure. The operations of method 1900 may be implemented by a base station 105 or its components as described herein. For example, the operations of method 1900 may be performed by a base station TTI coordination manager as described with reference to FIGS. 13 through 15. In some examples, a base station 105 may execute a set of codes to control the functional elements of the device to perform the functions described below. Additionally or alternatively, the base station 105 may perform aspects the functions described below using special-purpose hardware.

At block 1905, the base station 105 may transmit first data during a first TTI of the second duration and second data during a second TTI of the second duration. The operations of block 1905 may be performed according to the methods as described with reference to FIG. 2. In some examples, aspects of the operations of block 1905 may be performed by a transmitter as described with reference to FIGS. 13 through 15.

At block 1910, the base station 105 may identify an uplink TTI of the first duration in the TDD configuration based on a feedback timing associated with TTIs of the second duration. The operations of block 1910 may be performed according to the methods as described with reference to FIG. 2. In some examples, aspects of the operations of block 1910 may be performed by a feedback timing component as described with reference to FIGS. 13 through 15.

At block 1915, the base station 105 may receive first feedback for the first data and second feedback for the second data during the uplink TTI of the first duration. The operations of block 1915 may be performed according to the methods as described with reference to FIG. 2. In some examples, aspects of the operations of block 1915 may be performed by a receiver as described with reference to FIGS. 13 through 15.

Figure 20:
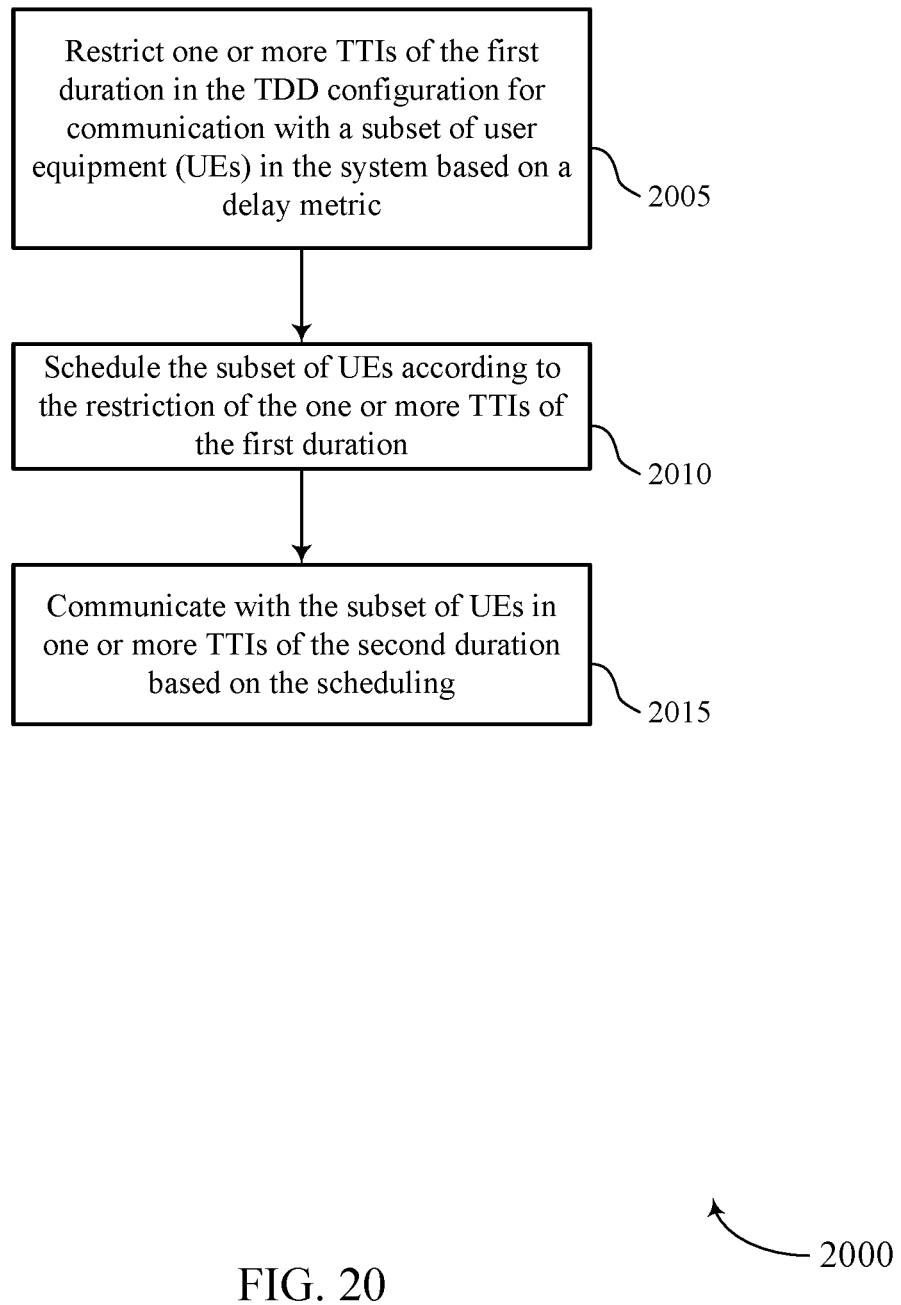

FIG. 20 shows a flowchart illustrating a method 2000 for multiple TTI coordination within a TDD configuration in accordance with various aspects of the present disclosure. The operations of method 2000 may be implemented by a base station 105 or its components as described herein. For example, the operations of method 2000 may be performed by a base station TTI coordination manager as described with reference to FIGS. 13 through 15. In some examples, a base station 105 may execute a set of codes to control the functional elements of the device to perform the functions described below. Additionally or alternatively, the base station 105 may perform aspects the functions described below using special-purpose hardware.

At block 2005, the base station 105 may restrict one or more TTIs of the first duration in the TDD configuration for communication with a subset of user equipment (UEs) in the system based on a delay metric. The operations of block 2005 may be performed according to the methods as described with reference to FIG. 2. In some examples, aspects of the operations of block 2005 may be performed by a scheduling restriction component as described with reference to FIGS. 13 through 15.

At block 2010, the base station 105 may schedule the subset of UEs according to the restriction of the one or more TTIs of the first duration. The operations of block 2010 may be performed according to the methods as described with reference to FIG. 2. In some examples, aspects of the operations of block 2010 may be performed by a scheduling component as described with reference to FIGS. 13 through 15.

At block 2015, the base station 105 may communicate with the subset of UEs in one or more TTIs of the second duration based on the scheduling. The operations of block 2015 may be performed according to the methods as described with reference to FIG. 2. In some examples, aspects of the operations of block 2015 may be performed by a transmitter as described with reference to FIGS. 13 through 15.

Figure 21:
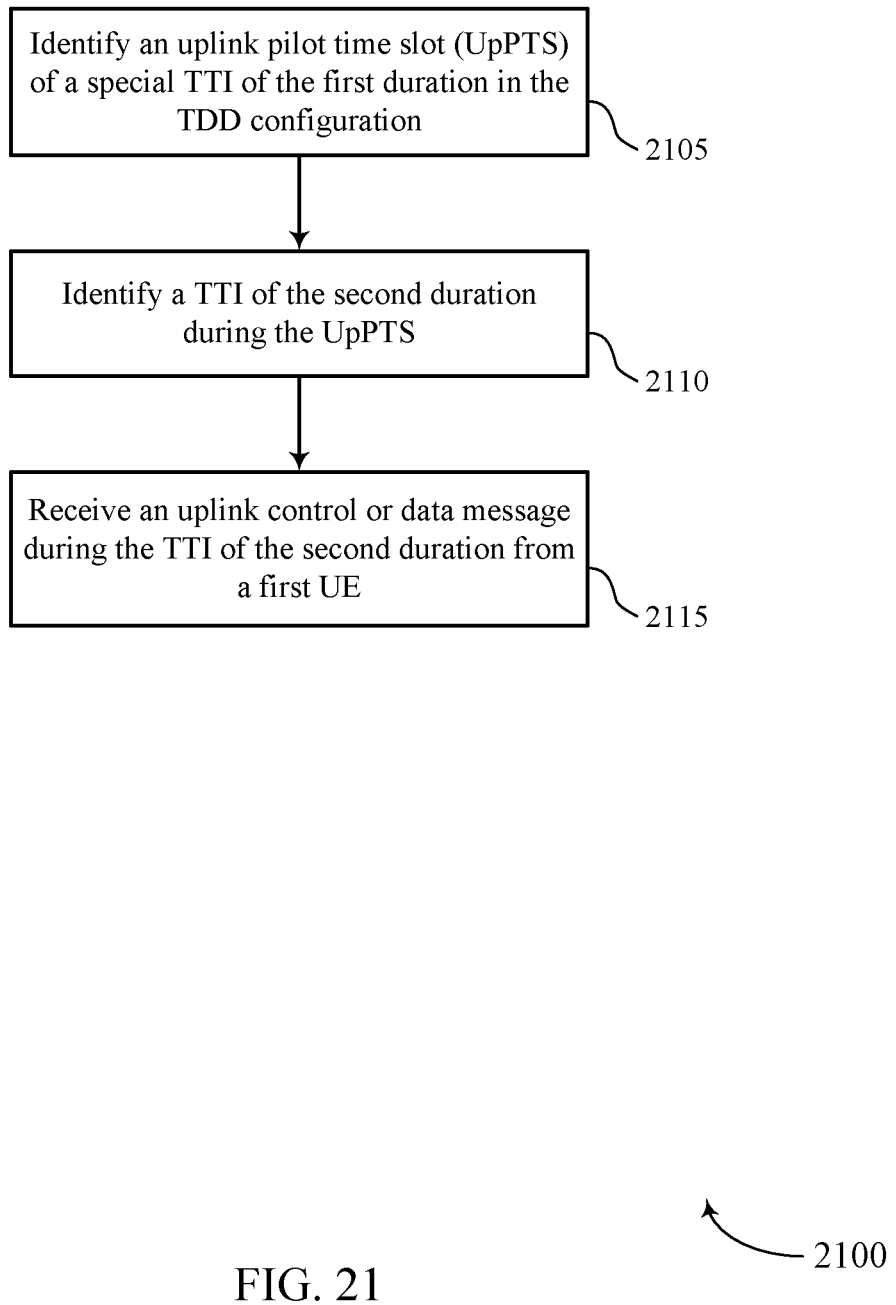

FIG. 21 shows a flowchart illustrating a method 2100 for multiple TTI coordination within a TDD configuration in accordance with various aspects of the present disclosure. The operations of method 2100 may be implemented by a base station 105 or its components as described herein. For example, the operations of method 2100 may be performed by a base station TTI coordination manager as described with reference to FIGS. 13 through 15. In some examples, a base station 105 may execute a set of codes to control the functional elements of the device to perform the functions described below. Additionally or alternatively, the base station 105 may perform aspects the functions described below using special-purpose hardware.

At block 2105, the base station 105 may identify an UpPTS of a special TTI of the first duration in the TDD configuration. The operations of block 2105 may be performed according to the methods as described with reference to FIG. 2. In some examples, aspects of the operations of block 2105 may be performed by a special subframe component as described with reference to FIGS. 13 through 15.

At block 2110, the base station 105 may identify a TTI of the second duration during the UpPTS. The operations of block 2110 may be performed according to the methods as described with reference to FIG. 2. In some examples, aspects of the operations of block 2110 may be performed by a special subframe component as described with reference to FIGS. 13 through 15.

At block 2115, the base station 105 may receive an uplink control or data message during the TTI of the second duration from a first UE. The operations of block 2115 may be performed according to the methods as described with reference to FIG. 2. In some examples, aspects of the operations of block 2115 may be performed by a receiver as described with reference to FIGS. 13 through 15.

In some examples, aspects from two or more of the methods may be combined. It should be noted that the methods are just example implementations, and that the operations of the methods may be rearranged or otherwise modified such that other implementations are possible.

Techniques described herein may be used for various wireless communications systems such as code division multiple access (CDMA), time division multiple access (TDMA), FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are new releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 as described with reference to FIGS. 1 and 2—may include one or more carriers, where each carrier may be a signal made up of multiple subcarriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication in a system that supports a time division duplexing (TDD) configuration with transmission time intervals (TTIs) of a first duration and TTIs of a second duration that is less than the first duration, comprising:
   identifying an uplink pilot time slot (UpPTS) of a special TTI of the first duration in the TDD configuration;
   identifying a TTI of the second duration during the UpPTS and an uplink transmission scheduled for a portion of the UpPTS different from a sounding reference signal (SRS) portion of the UpPTS; and transmitting an uplink acknowledgement message responsive to a downlink message during the TTI of the second duration and on the portion of the UpPTS different from the SRS portion of the UpPTS.

2. The method of claim 1, further comprising:
identifying a guard period during the special TTI of the first duration;
identifying an additional TTI of the second duration during the guard period;
transmitting an additional uplink message during the additional TTI of the second duration.

3. The method of claim 1, further comprising:
transmitting the uplink acknowledgement message during a time period that comprises the portion of the UpPTS different from the SRS portion of the UpPTS and a portion of an uplink TTI of the first duration in the TDD configuration.

4. An apparatus for wireless communication in a system that supports a time division duplexing (TDD) configuration with transmission time intervals (TTIs) of a first duration and TTIs of a second duration that is less than the first duration, comprising:
a processor;
memory coupled with the processor; and
instructions stored in the memory and operable, when executed by the processor, to cause the apparatus to:
identify an uplink pilot time slot (UpPTS) of a special TTI of the first duration in the TDD configuration;
identify a TTI of the second duration during the UpPTS and an uplink transmission scheduled for a portion of the UpPTS different from a sounding reference signal (SRS) portion of the UpPTS; and
transmit an uplink acknowledgement message responsive to a downlink message during the TTI of the second duration and on the portion of the UpPTS different from the SRS portion of the UpPTS.

5. The apparatus of claim 4, further comprising instructions stored in the memory and executable by the processor to cause the apparatus to:
identify a guard period during the special TTI of the first duration;
identify an additional TTI of the second duration during the guard period; and
transmitting an additional uplink message during the additional TTI of the second duration.

6. The apparatus of claim 4, further comprising instructions stored in the memory and executable by the processor to cause the apparatus to:
transmit the uplink acknowledgement message during a time period that comprises the portion of the UpPTS different from the SRS portion of the UpPTS and a portion of an uplink TTI of the first duration in the TDD configuration.

7. An apparatus for wireless communication in a system that supports a time division duplexing (TDD) configuration with transmission time intervals (TTIs) of a first duration and TTIs of a second duration that is less than the first duration, comprising:

means for identifying an uplink pilot time slot (UpPTS) of a special TTI of the first duration in the TDD configuration;
means for identifying a TTI of the second duration during the UpPTS and an uplink transmission scheduled for a portion of the UpPTS different from a sounding reference signal (SRS) portion of the UpPTS; and
means for transmitting an uplink acknowledgement message responsive to a downlink message during the TTI of the second duration and on the portion of the UpPTS different from the SRS portion of the UpPTS.

8. The apparatus of claim 7, further comprising:
means for identifying a guard period during the special TTI of the first duration;
means for identifying an additional TTI of the second duration during the guard period; and
means for transmitting an additional uplink message during the additional TTI of the second duration.

9. The apparatus of claim 7, further comprising:
means for transmitting the uplink acknowledgement message during a time period that comprises the portion of the UpPTS different from the SRS portion of the UpPTS and a portion of an uplink TTI of the first duration in the TDD configuration.

10. A non-transitory computer-readable medium storing code for wireless communication in a system that supports a time division duplexing (TDD) configuration with transmission time intervals (TTIs) of a first duration and TTIs of a second duration that is less than the first duration, the code comprising instructions executable by a processor to:
identify an uplink pilot time slot (UpPTS) of a special TTI of the first duration in the TDD configuration;
identify a TTI of the second duration during the UpPTS and an uplink transmission scheduled for a portion of the UpPTS different from a sounding reference signal (SRS) portion of the UpPTS; and
transmit an uplink acknowledgement message responsive to a downlink message during the TTI of the second duration and on the portion of the UpPTS different from the SRS portion of the UpPTS.

11. The non-transitory computer-readable medium of claim 10, wherein the instructions are further executable to:
identify a guard period during the special TTI of the first duration;
identify an additional TTI of the second duration during the guard period; and
transmit an additional uplink message during the additional TTI of the second duration.

12. The non-transitory computer-readable medium of claim 10, wherein the instructions are further executable to:
transmit the uplink acknowledgement message during a time period that comprises the portion of the UpPTS different from the SRS portion of the UpPTS and a portion of an uplink TTI of the first duration in the TDD configuration.

* * * * *